United States Patent
Chu et al.

(10) Patent No.: US 11,463,333 B2
(45) Date of Patent: *Oct. 4, 2022

(54) DISTRIBUTED ASSIGNMENT OF VIDEO ANALYTICS TASKS IN CLOUD COMPUTING ENVIRONMENTS TO REDUCE BANDWIDTH UTILIZATION

(71) Applicant: Intel Corporation, Santa Clara, CA (US)

(72) Inventors: Hong-Min Chu, Taipei (TW);
Shao-Wen Yang, San Jose, CA (US);
Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,597

(22) Filed: Sep. 13, 2021

(65) Prior Publication Data

US 2022/0173987 A1 Jun. 2, 2022

Related U.S. Application Data

(63) Continuation of application No. 16/736,539, filed on Jan. 7, 2020, now Pat. No. 11,121,949, which is a
(Continued)

(51) Int. Cl.
*G06F 15/173* (2006.01)
*H04L 43/045* (2022.01)
(Continued)

(52) U.S. Cl.
CPC ............ *H04L 43/045* (2013.01); *H04L 12/44* (2013.01); *H04L 41/0896* (2013.01); *H04L 41/12* (2013.01); *H04L 67/02* (2013.01)

(58) Field of Classification Search
CPC ... H04L 43/045; H04L 12/44; H04L 41/0896; H04L 41/12; H04L 67/02
(Continued)

(56) References Cited

U.S. PATENT DOCUMENTS 7,680,038 B1 3/2010 Gourlay
9,344,751 B1 5/2016 Ream et al.
(Continued)

FOREIGN PATENT DOCUMENTS

WO 2015147764 A1 10/2015

OTHER PUBLICATIONS

International Bureau, "International Preliminary Report on Patentability," mailed in connection with International Patent Application No. PCT/US2017/058814, dated Jun. 4, 2019, 7 pages.
(Continued)

*Primary Examiner* — Liang Che A Wang
(74) *Attorney, Agent, or Firm* — Hanley, Flight & Zimmerman, LLC

(57) ABSTRACT

Example task assignment methods disclosed herein for video analytics processing in a cloud computing environment include determining a graph, such as a directed acyclic graph, including nodes and edges to represent a plurality of video sources, a cloud computing platform, and a plurality of intermediate network devices in the cloud computing environment. Disclosed example task assignment methods also include specifying task orderings for respective sequences of video analytics processing tasks to be executed in the cloud computing environment on respective video source data generated by respective ones of the video sources. Disclosed example task assignment methods further include assigning, based on the graph and the task orderings, combinations of the video sources, the intermediate network devices and the cloud computing platform to execute the
(Continued)

respective sequences of video analytics processing tasks to reduce an overall bandwidth utilized by the sequences of video analytics processing tasks in the cloud computing environment.

20 Claims, 9 Drawing Sheets

Related U.S. Application Data continuation of application No. 15/364,200, filed on Nov. 29, 2016, now Pat. No. 10,567,248.

(51) Int. Cl.
*H04L 41/12* (2022.01)
*H04L 12/44* (2006.01)
*H04L 41/0896* (2022.01)
*H04L 67/02* (2022.01)

(58) Field of Classification Search
USPC .......................................... 709/221, 223, 224
See application file for complete search history.

(56) References Cited

U.S. PATENT DOCUMENTS

| | | | |
|---|---|---|---|
| 10,567,248 B2 | 2/2020 | Chu et al. | |
| 11,121,949 B2 | 9/2021 | Chu et al. | |
| 2005/0262470 A1* | 11/2005 | Gavrilov | G06F 16/9024 707/E17.011 |
| 2007/0297332 A1 | 12/2007 | Broberg et al. | |
| 2008/0184245 A1 | 7/2008 | St-Jean | |
| 2010/0011410 A1* | 1/2010 | Liu | H04L 63/20 726/1 |
| 2013/0051250 A1 | 2/2013 | Shaffer et al. | |
| 2014/0282586 A1 | 9/2014 | Shear et al. | |
| 2015/0039444 A1 | 2/2015 | Hardin et al. | |
| 2015/0046678 A1* | 2/2015 | Moloney | G06T 1/20 712/29 |
| 2015/0264627 A1* | 9/2015 | Perdomo | H04W 40/12 370/329 |
| 2016/0034306 A1* | 2/2016 | Galdy | G06F 9/5066 718/104 |
| 2016/0124739 A1* | 5/2016 | Zongker | G06F 8/658 717/172 |
| 2016/0174192 A1* | 6/2016 | Raghu | H04W 72/1289 370/329 |
| 2016/0210263 A1 | 7/2016 | Guerin et al. | |
| 2016/0255355 A1* | 9/2016 | Andersson | H04N 19/40 375/240.02 |
| 2016/0299897 A1 | 10/2016 | Silva et al. | |
| 2016/0314818 A1 | 10/2016 | Kirk et al. | |
| 2017/0060574 A1* | 3/2017 | Malladi | G06F 9/542 |
| 2017/0243083 A1* | 8/2017 | Wang | G06V 20/40 |
| 2018/0052711 A1 | 2/2018 | Zhou et al. | |
| 2018/0069933 A1 | 3/2018 | Chandra et al. | |
| 2020/0287834 A1* | 9/2020 | Ramanathan | H04L 47/12 |

OTHER PUBLICATIONS

International Searching Authority "International Search Report," mailed in connection with International Patent Application No. PCT/US2017/058814, dated Mar. 9, 2018, 3 pages.

International Searching Authority "Written Opinion," mailed in connection with International Patent Application No. PCT/US2017/058814, dated Mar. 9, 2018, 6 pages.

United States Patent and Trademark Office, "Notice of Allowance," mailed in connection with U.S. Appl. No. 15/364,200, dated Oct. 8, 2019, 8 pages.

United States Patent and Trademark Office, "Final Office Action," mailed in connection with U.S. Appl. No. 15/364,200, dated Apr. 8, 2019, 23 pages.

United States Patent and Trademark Office, "Non-final Office Action," mailed in connection with U.S. Appl. No. 15/364,200, dated Oct. 11, 2018, 17 pages.

United States Patent and Trademark Office, "Non-final Office Action," mailed in connection with U.S. Appl. No. 16/736,539, dated Oct. 5, 2020, 7 pages.

United States Patent and Trademark Office, "Final Office Action," mailed in connection with U.S. Appl. No. 16/736,539, dated Jan. 7, 2021, 12 pages.

United States Patent and Trademark Office, "Notice of Allowance," mailed in connection with U.S. Appl. No. 16/736,539, dated May 6, 2021, 10 pages.

* cited by examiner

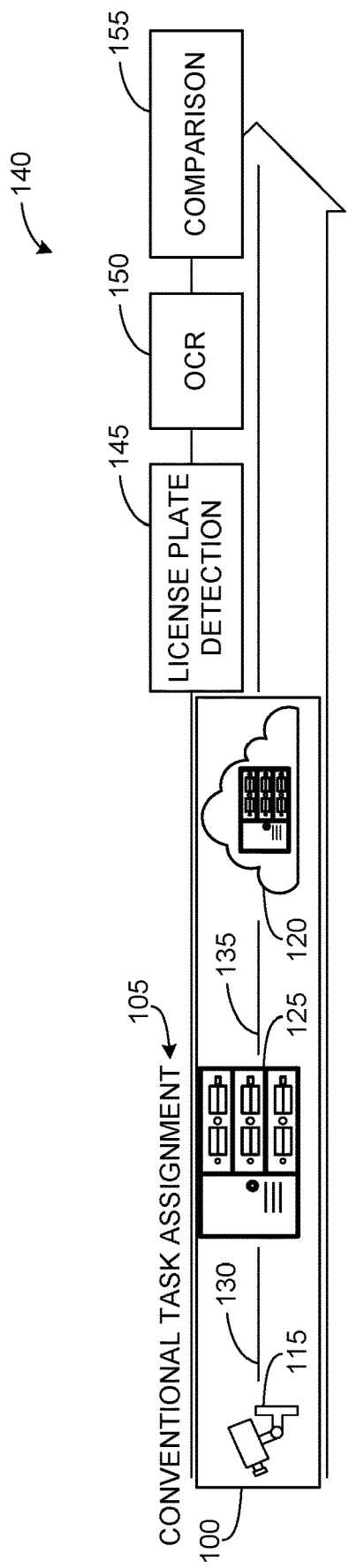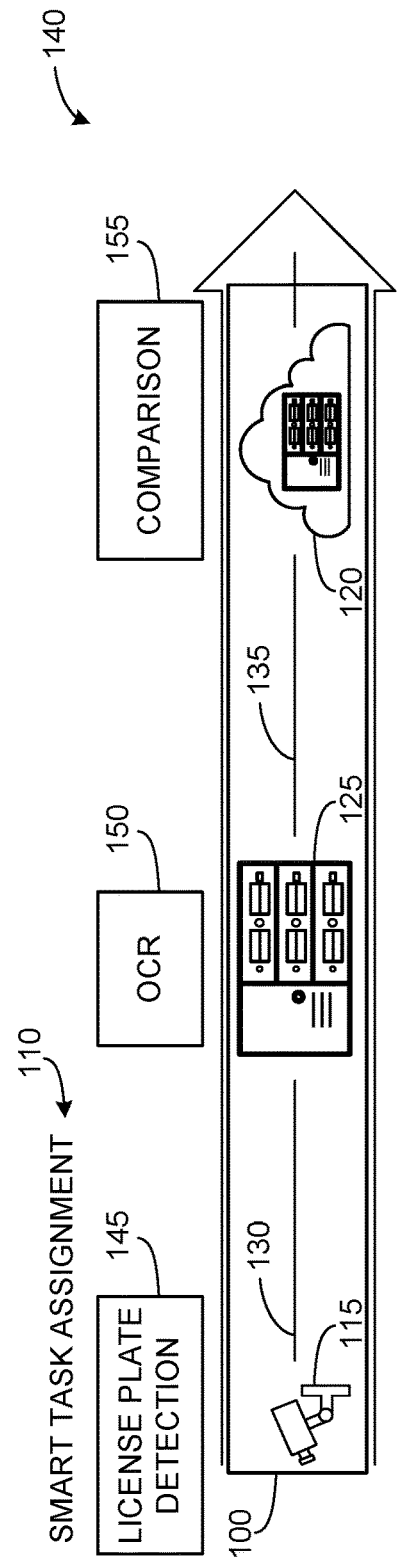

MODEL PARALLELISM

MODEL + DATA PARALLELISM

EXAMPLE DISTRIBUTED VIDEO ANALYTICS TASK ASSIGNMENT PROCEDURE

MINIMIZE $\sum_{i=1}^{L} \sum_{j=1}^{f-1} c^T x_i^j$ (UPSTREAM COST) —— 505

SUBJECT TO $\sum_{i=1}^{L} \sum_{j=1}^{f} Ar_i^j(x_i^j - x_i^{j-1}) \leq br$ (RESOURCE CONSTRAINT) —— 510

$\sum_{i=1}^{L} \sum_{j=1}^{f-1} Ae_i^j x_i^j \leq be$ (BANDWIDTH CONSTRAINT) —— 515

$o^T(x_i^j - x_i^{j'}) \geq 0$ $\forall\, i, j, j'$ (ORDER) —— 520

$1^T x_i^j = 1$, $\forall\, i, j$ (SINGLE CHOICE) —— 525

$x \in \{0, 1\}^{N+1}$, $\forall\, i, j$

FIG. 5

RESOURCE CONSTRAINT $\sum_{i=1}^{L} \sum_{j=1}^{J} \boldsymbol{Ar}_i^j (\boldsymbol{x}_i^j - \boldsymbol{x}_i^{j-1}) \leq br$ ⟵ 510

$$\boldsymbol{Ar}_i^j(k,:) = \begin{cases} 0^T & \text{if } D_j^{(i)} \neq D_k \\ sr^T & \text{if } D_j^{(i)} = D_k \end{cases}$$

| $\boldsymbol{Ar}_i^j$ (N+1) | | | | | $(\boldsymbol{x}_i^j - \boldsymbol{x}_i^{j-1})$ | | $br$ |
|---|---|---|---|---|---|---|---|
| sr₀ | sr₁ | ... | sr_N | | -1 | | R₁ |
| : | : | : | : | × | : | ≤ | : |
| | | | | | 1 | | |
| 0 | 0 | ... | 0 | | 0 | | R_m |

$\sum_{i=1}^{L} M$ rows ; result vector length M

FIG. 8

BANDWIDTH CONSTRAINT $\sum_{i=1}^{L} \sum_{j=1}^{J} \boldsymbol{Ae}_i^j \boldsymbol{x}_i^j \leq \boldsymbol{be}$ ⟵ 515

$$\boldsymbol{Ae}_i^j(k,l) = \begin{cases} 0 & \text{if } D_j^{(i)} \neq D_k \\ sr^T & \text{if } D_j^{(i)} = D_k \end{cases}$$

| $\boldsymbol{Ae}_i^j$ (N+1) | | | | | $\boldsymbol{x}_i^j$ | | $\boldsymbol{be}$ |
|---|---|---|---|---|---|---|---|
| UB₀ | UB₁ | ... | UB_N | | 1 | | U₁ |
| : | : | : | : | × | 0 | ≤ | : |
| | | | | | : | | |
| 0 | 0 | ... | 0 | | 0 | | U_m |

FIG. 9

DISTRIBUTED ASSIGNMENT OF VIDEO ANALYTICS TASKS IN CLOUD COMPUTING ENVIRONMENTS TO REDUCE BANDWIDTH UTILIZATION

RELATED APPLICATION(S)

This patent arises from a continuation of U.S. patent application Ser. No. 16/736,539 (now U.S. Pat. No. 11,121, 949), which is entitled "DISTRIBUTED ASSIGNMENT OF VIDEO ANALYTICS TASKS IN CLOUD COMPUTING ENVIRONMENTS TO REDUCE BANDWIDTH UTILIZATION," and which was filed on Jan. 7, 2020, which is a continuation of U.S. patent application Ser. No. 15/364, 200 (now U.S. Pat. No. 10,567,248), which is entitled "DISTRIBUTED ASSIGNMENT OF VIDEO ANALYTICS TASKS IN CLOUD COMPUTING ENVIRONMENTS TO REDUCE BANDWIDTH UTILIZATION," and which was filed on Nov. 29, 2016. Priority to U.S. patent application Ser. No. 16/736,539 and U.S. patent application Ser. No. 15/364,200 is claimed. U.S. patent application Ser. No. 16/736,539 and U.S. patent application Ser. No. 15/364,200 are hereby incorporated herein by reference in their respective entireties.

FIELD OF THE DISCLOSURE

This disclosure relates generally to video analytics processing in cloud computing environments and, more particularly, to distributed assignment of video analytics tasks in cloud computing environments to reduce bandwidth utilization.

BACKGROUND

Video analytics involves processing video data to detect and identify content, features, information, events, etc., contained in the video frames represented by the video data. The use of video analytics is becoming ever more pervasive in modern society given its ability to improve convenience and security in a host of different applications. For example, video analytics can be used in a wide variety of applications, such as license plate detection for toll collection, facial recognition for passport control operations, object detection for airport screening, etc. Due to its associated processing requirements, video analytics applications can be natural candidates for implementation in a cloud computing environment.

BRIEF DESCRIPTION OF THE DRAWINGS

FIGS. 1A-1B illustrate an example conventional assignment of video analytics processing tasks in an example cloud computing environment, and an example distributed assignment of video analytics processing tasks in the example cloud computing environment in accordance with the teachings of this disclosure.

FIG. 5 illustrates an example task assignment procedure to be performed by the example video analytics task scheduler of FIG. 4 to implement distributed assignment of video analytics processing tasks in the example cloud computing environment of FIG. 1B.

FIG. 8 illustrates an example implementation of an example resource utilization constraint to be satisfied by the example video analytics task scheduler of FIG. 4 when performing the example task assignment procedure of FIG. 5.

FIG. 9 illustrates an example implementation of an example bandwidth utilization constraint to be satisfied by the example video analytics task scheduler of FIG. 4 when performing the example task assignment procedure of FIG. 5.

The figures are not to scale. Wherever possible, the same reference numbers will be used throughout the drawing(s) and accompanying written description to refer to the same or like parts, elements, etc.

DETAILED DESCRIPTION

Figure 2A:
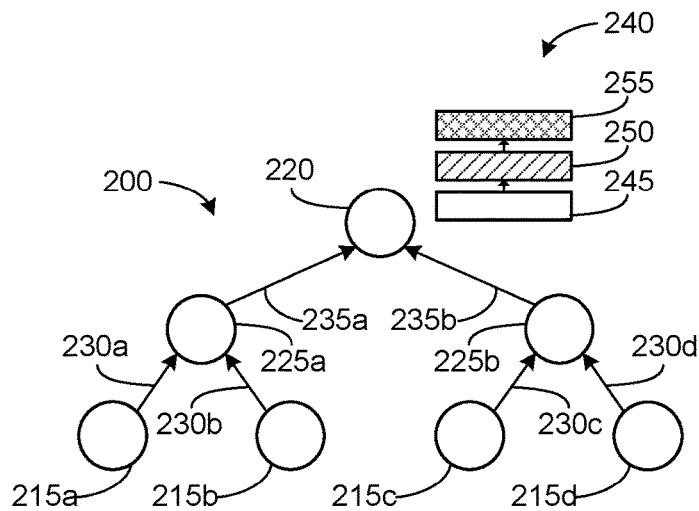
FIGS. 2A-2B illustrates an example directed acyclic graph and example model ordering, model parallelism and data parallelism properties that may be used to implement distributed assignment of video analytics processing tasks in the example cloud computing environment of FIG. 1B.

Methods, apparatus, systems and articles of manufacture (i.e., physical storage media) to distribute assignment of video analytics tasks in cloud computing environments to reduce bandwidth utilization are disclosed herein. Example task assignment methods disclosed herein for video analytics processing in a cloud computing environment include determining a directed acyclic graph including nodes and edges to represent video sources, a cloud computing platform, and intermediate network devices in the cloud computing environment. The intermediate network devices include those network elements, such as routers, gateways, etc., that communicate data from the video sources to the cloud computing platform. Disclosed example task assignment methods also include specifying task orderings for respective sequences of video analytics processing tasks to be executed in the cloud computing environment on respective video source data generated by respective ones of the video sources. Disclosed example task assignment methods further include assigning, based on the directed acyclic graph and the task orderings, combinations of the video sources, the intermediate network devices and the cloud computing platform to execute the respective sequences of video analytics processing tasks to reduce an overall bandwidth utilized by the sequences of video analytics processing tasks in the cloud computing environment.

In some disclosed examples, the nodes of the directed acyclic graph include a root node to represent the cloud computing platform, leaf nodes (also referred to as edge nodes in some contexts) to represent the video source devices, and intermediate nodes to represent the intermediate network devices. In some disclosed examples, the edges of the directed acyclic graph include a first set of edges representing available communication paths between the video source devices and the intermediate network devices, and a second set of edges representing available communication paths between the intermediate network devices and the cloud computing platform in the cloud computing environment. Furthermore, in some disclosed examples, the directed acyclic graph defines, for each leaf node, one respective uplink data path from that leaf node to the cloud computing platform.

For example, in some disclosed example task assignment methods, a first leaf node of the directed acyclic graph corresponds to a first video source, a first combination of nodes defines a first uplink path from the first leaf node to the cloud computing platform, and the assigning performed by the methods includes assigning at least some of the first combination of nodes included in the first uplink path to execute a first one of the sequences of video analytics processing tasks to preserve, along the first uplink path, a first task ordering for the first one of the sequences of video analytics processing tasks. Furthermore, in some such disclosed example task assignment methods, tasks ordered later in the first task ordering for the first one of the sequences of video analytics processing tasks are associated with lower bandwidth utilization than tasks ordered earlier in the first task ordering for the first one of the sequences of video analytics processing tasks. Accordingly, in some such disclosed example task assignment methods, the assigning performed by the methods further includes (1) assigning a first node in the first combination of nodes to execute a first task in the first one of the sequences of video analytics processing tasks, the first node at a first position of the first uplink path, (2) assigning a second node in the first combination of nodes to execute a second task in the first one of the sequences of video analytics processing tasks, the second node at a second position of the first uplink path subsequent to the first position, and (3) assigning the second node to execute each other task in the first one of the sequences of video analytics processing tasks ordered between the first task and the second task in the first task ordering.

Additionally or alternatively, in some disclosed example task assignment methods, the assigning performed by the methods is further based on a resource utilization constraint and a bandwidth utilization constraint. In some such examples, the resource utilization constraint is to ensure available processing resources represented by the leaf nodes and the intermediate nodes of the directed acyclic graph are not exceeded, and the bandwidth utilization constraint is to ensure available bandwidths represented by the first set of edges and the second set of edges of the directed acyclic graph are not exceeded.

For example, in some such disclosed example task assignment methods, the assigning performed by the methods further includes iteratively determining different candidate assignments of respective combination of the video sources, the intermediate network devices and the cloud computing platform to execute the respective sequences of video analytics processing tasks associated with the video sources. Some such disclosed example task assignment methods also include, for a first one of the candidate assignments: (1) evaluating a first matrix-based equation to determine whether the first one of the candidate assignments satisfies the resource utilization constraint, (2) evaluating a second matrix-based equation to determine whether the first one of the candidate assignments satisfies the bandwidth utilization constraint, and (3) retaining the first one of the candidate assignments when the first one of the candidate assignments utilizes a lower overall bandwidth in the cloud computing environment than a prior retained second one of the candidate assignments.

Furthermore, in some such disclosed example task assignment methods, the assigning performed by the methods further includes defining dummy tasks to represent generation of the respective video source data by the respective ones of the video sources. Some such disclosed example task assignment methods also include inserting the dummy tasks at initial positions of the respective sequences of video analytics processing tasks associated with the respective ones of the video sources, and using the respective sequences of video analytics processing tasks updated to include the dummy tasks to evaluate the first and second matrix-based equations.

These and other example methods, apparatus, systems and articles of manufacture (e.g., physical storage media) to distribute assignment of video analytics tasks in cloud computing environments to reduce bandwidth utilization are disclosed in further detail below.

As noted above, video analytics is becoming ever more pervasive in modern society given its ability to improve convenience and security in a host of different applications, such as license plate detection for toll collection, facial recognition for passport control operations, object detection for airport screening, etc. Video analytics processing is also a natural candidate for implementation in a cloud computing environment due to its computationally intensive processing requirements. However, conventional cloud computing implementations assign most, if not all, of the video analytics processing tasks for a given application to the cloud computing platform itself, with little to no video analytics processing being executed by other video source devices and/or network devices external to the cloud computing platform. As a result, such conventional cloud computing implementations can utilize excessive network bandwidth to communicate the raw video data from the video source devices to the cloud computing platform for video analytics processing.

Unlike such conventional cloud computing implementations, the teachings of the present disclosure provide technical solutions to the technical problem of excessive bandwidth utilization by video analytics applications in a cloud computing environment. For example, unlike such conventional cloud computing implementations, distributed assignment of video analytics processing tasks in accordance with the teaching of this disclosure offloads at least some of the video analytics processing tasks from the cloud computing platform to the video source devices and/or other network devices in the cloud computing environment to reduce the overall network bandwidth utilized for video analytics processing. As disclosed in further detail below, by assigning at least some of the video analytics processing tasks to the video source devices and other network devices external to the cloud computing platform, the amount of data conveyed in an uplink direction from the video sources to the cloud computing platform in the cloud computing environment can be reduced.

Video analytics processing can usually be modeled as an ordered sequence of video analytics tasks to be performed on input video data, with tasks later in the sequence outputting data having lower bandwidth requirements than earlier tasks in the sequence. This is referred to herein as the "model ordering property" of video analytics processing. For example, video analytics processing for license plate recognition may include a license plate detection task to detect an object in a video frame that is consistent with a license plate, an optical character recognition (OCR) task to determine a license plate number of a license plate detected by the license plate detection task, and a comparison task to compare the license plate number determined from the OCR task with a reference library to recognize the license plate number and provide a pointer to a database containing registration details (e.g., vehicle owner, make, model, year, registration status, etc.) associated with the license plate number. In such an example, the output of the license plate detection task may be an image, the output of the OCR task may be a string of characters (which has lower bandwidth attributes than the image output from the license plate detection task), and the output of the comparison task may be a pointer (e.g., such as a memory address, which may have lower bandwidth attributes that the string of characters output from the OCR task).

Also, for a given video source, the ordered sequence of video analytics tasks can often be performed in parallel in a pipelined manner such that earlier video data (e.g., video data associated with time t−1) can be processed by a video analytics task (e.g., the OCR task) that is later in the ordered task sequence while later video data (e.g., video data associated with time t) can also be processed by a video analytics task (e.g., the license plate recognition task) that is earlier in the ordered task sequence. This is referred to herein as the "model parallelism property" of video analytics processing. Furthermore, video analytics processing of video data from different video data sources can often be performed in parallel. This is referred to herein as the "data parallelism property" of video analytics processing. As disclosed in further detail below, example distributed video analytics task assignment procedures disclosed herein take advantage of such model ordering, model parallelism and/or data parallelism properties to distribute assignment of data analytics processing tasks to video source devices and other network devices external to the cloud computing platform to reduce overall bandwidth utilization in the cloud computing environment.

For example, and as disclosed in further detail below, disclosed example distributed video analytics task assignment procedures utilize a directed acyclic graph (DAG) to represent the topology of the cloud computing environment. The DAG is further used to assign video source devices and/or other network devices to execute video analytics processing tasks in a manner that maintains the model ordering and model parallelism properties of the particular video analytics application being implemented. Moreover, example distributed video analytics task assignment procedures disclosed herein utilize an overall bandwidth utilization cost function in combination with one or more constraint functions to reduce, or even minimize, the overall network bandwidth to be utilized in the cloud computing environment for video analytics processing while also ensuring that constraints on the amounts of individual computing resources and/or bandwidths of the video source devices and/or other network devices to be utilized for video analytics processing are satisfied. In some examples, such cost and constraint functions are matrix-based to further take advantage of the data parallelism properties of the particular video analytics application being implemented.

Turning to the figures, a block diagram of an example cloud computing environment 100 structured to support video analytics processing applications is illustrated in FIGS. 1A-1B. FIG. 1A illustrates an example conventional assignment 105 of video analytics processing tasks in the example cloud computing environment 100. FIG. 1B illustrates an example distributed assignment 110 of video analytics processing tasks in the example cloud computing environment 100 in accordance with the teachings of this disclosure.

The example cloud computing environment 100 includes a group of one or more example video sources 115 in communication with an example cloud computing platform 120 via a group of one or more intermediate network devices 125. In the illustrated example of FIGS. 1A-1B, the video source(s) 115 can be implemented by any number(s) and/or type(s) of video source devices and/or any other edge device(s) capable of producing video data. For example, the video source(s) 115 can include one or more video cameras, computers, smartphones, image sensors, etc. In the illustrated example of FIGS. 1A-1B, the example cloud computing platform 120 can be implemented by any number(s) and/or type(s) of cloud computing platforms, such as one or more cloud computing platforms provided by Intel®, Amazon®, Google®, IBM®, Microsoft®, etc., and/or a host of other cloud computing platform providers. In the illustrated example of FIGS. 1A-1B, the intermediate network device(s) 125 can be implemented by any number(s) and/or type(s) of network devices capable of routing and/or otherwise receiving and transmitting video data in a network. For example, the intermediate network device(s) 125 can include one or more gateways, routers, bridges, servers, etc.

In the example cloud computing environment 100, the video source(s) 115 are interconnected with (or, more generally, in communication with) the intermediate network device(s) 125 via a first set of example communication paths 130, and the intermediate network device(s) 125 are interconnected with (or, more generally, in communication with) the cloud computing platform 120 via a second set of example communication paths 135. (In some examples, a third set of example communication paths, not shown, may provide further interconnections between some or all of the intermediate network device(s) 125 to implement a robust networking topology.) In the illustrated example of FIGS. 1A-1B, the communications paths 130 and 135 can be implemented by any number(s) and/or type(s) of communication paths capable of conveying data between devices. For example, the communications paths 130 and 135 can be implemented by one or more tunnels, data flows, links, channels, etc., in one or more communication networks, such as the Internet.

As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIGS. 1A-1B, the cloud computing environment 100 is to be used to implement an example license plate video analytics application 140 that performs license plate recognition on respective video data output from the different video sources 115. The example license plate video analytics application 140 of FIGS. 1A-1B includes a sequence of video analytics tasks including an example license plate detection task 145, an example OCR task 150, and an example comparison task 155. The example license plate detection task 145 detects an object in a video frame that is consistent with a license plate. The example OCR task 150 determines a license plate number of a license plate image detected by the license plate detection task 145. The example comparison task 155 compares the license plate number determined from the OCR task 150 with a reference library to recognize the license plate number and provide a pointer to a database containing registration details (e.g., vehicle owner, make, model, year, registration status, etc.) associated with the license plate number.

In the illustrated example of FIGS. 1A-1B, the sequence of video analytics tasks implementing the example license plate video analytics application 140 is an ordered sequence having a particular task ordering, with the example license plate detection task 145 to be performed on video data output from a particular video source 115, followed by the OCR task 150 processing data output from the license plate detection task 145, followed by the comparison task 155 processing data output from the OCR task 150. Furthermore, the ordered sequence of video analytics tasks implementing the example license plate video analytics application 140 are such that tasks later in the sequence output data having lower bandwidth requirements than earlier tasks in the sequence. For example, the output of the license plate detection task 145 may be an image, the output of the OCR task 150 may be a string of characters (which has lower bandwidth attributes than the image output from the license plate detection task 145), and the output of the comparison task 155 may be a pointer (e.g., such as a memory address, which may have lower bandwidth attributes than the string of characters output from the OCR task 150).

In the example conventional video analytics task assignment 105 illustrated in FIG. 1A, all of the video analytics processing tasks to performed on the video data from the respective video sources 115 are assigned to the cloud computing platform 120. As such, the cloud computing platform 120 is assigned the license plate detection task 145, the OCR task 150 and the comparison task 155 for execution on each stream of video data received from each video source 115, as shown. Such a conventional task assignment places the bulk of the video analytics processing at the cloud computing platform 120, but at the expense of utilizing substantial network bandwidth to send the raw video data from each of the video sources 115 to the cloud computing platform 120 for processing by the license plate detection task 145, the OCR task 150 and the comparison task 155. For example, if the video sources 115 output 1080p high definition video at 25 frames per second (fps), then each video source 115 will utilize a bandwidth of approximately 27.2 Mbps in the cloud computing environment 100. Thus, the total bandwidth utilization for the example conventional video analytics task assignment 105 will be approximately L×27.2 Mbps, where L is the number of video sources 115. If the number of video sources 115 (L) providing raw video data to be processed is large, the conventional video analytics task assignment 105 may result in an impractical, or even impossible, solution depending on the amount of available bandwidth in the cloud computing environment 100.

In contrast, the distributed video analytics task assignment 110 of FIG. 1B assigns, in accordance with the teachings of this disclosure, one or more of the video analytics processing tasks of the example license plate video analytics application 140 to one or more of the video sources 115 and/or the intermediate network devices 125, which are external to the cloud computing platform 120 in the cloud computing environment 100. For example, the distributed video analytics task assignment 110 illustrated in the example of FIG. 1B assigns, as disclosed in further detail below, the video sources 115 to execute respective license plate detection tasks 145 on their respective video data. The distributed video analytics task assignment 110 of the illustrated example also assigns the intermediate network devices 125 to execute the OCR tasks 150 on respective output data, if any, received from the respective license plate detection tasks 145. The distributed video analytics task assignment 110 shown in the example of FIG. 1B further assigns the cloud computing platform 120 to execute the comparison task 155 on respective output data, if any, received from the respective OCR tasks 150.

The example distributed video analytics task assignment 110 of FIG. 1B reduces the overall bandwidth utilized by the example license plate video analytics application 140 in the cloud computing environment 100 relative to the example conventional video analytics task assignment 105. For example, in the distributed video analytics task assignment 110, the respective license plate detection tasks 145 executed by the video sources 115 may output no data (and, thus, utilize no bandwidth) if a license plate is not detected in the video data. Moreover, if a license plate is detected, the respective license plate detection tasks 145 can output video data representing just the image of the license plate, rather than the entire video frame. Accordingly, the bandwidth utilized by the license plate detection tasks 145 will be a fraction a (where a is given by, for example, a ratio of license plate area divided by total video frame area) of the bandwidth (e.g., 27.2 Mbps) associated with the raw video data generated by each video source 115. Thus, the total bandwidth utilized on the example communication paths 130 for the example license plate video analytics application 140 is less than L×27.2α Mbps (because some license plate detection tasks 145 will output no data when no license plate is detected), which is a fraction of the bandwidth utilized by the conventional video analytics task assignment 105.

Relative to the conventional video analytics task assignment 105 of FIG. 1A, the example distributed video analytics task assignment 110 of FIG. 1B results in an even further bandwidth reduction on the example communication paths 135 of the cloud computing environment 100. For example, in the distributed video analytics task assignment 110, the OCR task 150 executed by the respective intermediate network device 125 may output no data (and, thus, utilize no bandwidth) if a license plate was not detected by its respective input license plate detection task 145. Moreover, if a license plate is detected, the respective OCR task 150 can output metadata representing just the license plate number, rather than video data. Accordingly, the bandwidth utilized on the example communication paths 135 of FIG. 1B by the OCR tasks 150 will be approximately L×the number of bits used to represent the license plate number (or less when no license plate is detected), which will be substantially less than the L×27.2 Mbps utilized by the conventional video analytics task assignment 105 of FIG. 1A.

The example distributed video analytics task assignment 110 of FIG. 1B takes advantage of the model ordering, model parallelism and data parallelism properties of the video analytics processing to be performed in the example cloud computing environment 100. To determine a distributed task assignment, such as the example distributed video analytics task assignment 110 of FIG. 1B, disclosed example distributed video analytics task assignment procedures utilize a directed acyclic graph (DAG) to represent the topology of the cloud computing environment 100, which includes the devices and communication path in the environment 100, as well as the available computing resources and bandwidth resources for the devices and communication paths in the environment 100. Disclosed example distributed video analytics task assignment procedures further utilize the DAG to assign one or more of the video source devices 115 and/or intermediate network devices 125 to execute the video analytics processing tasks (e.g., the tasks 145-155) in a manner that maintains the model ordering, model parallelism and data parallelism properties of the particular video analytics application (e.g., the application 140) being implemented in the cloud computing environment 100.

Figure 2B:
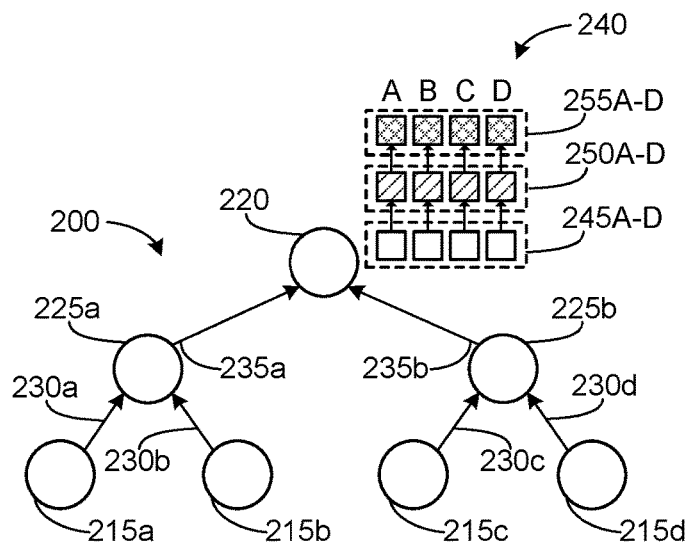

An example directed acyclic graph (DAG) 200 for use by example distributed video analytics task assignment procedures disclosed herein to assign one or more of the example video source devices 115 and/or the example intermediate network devices 125 to execute the video analytics processing tasks in the example cloud computing environment 100 of FIG. 1B is illustrated in FIGS. 2A-2B. The example DAG 200 includes example nodes (corresponding to circles in FIGS. 2A-2B) to represent the physical and/or logical devices included in the cloud computing environment 100. For example, the DAG 200 includes example leaf nodes 215A-D (also referred to as leaf nodes 215A-D) representing the example video sources 115 of FIG. 1B, and an example root node 220 representing the example cloud computing platform 120 of FIG. 1B. The DAG 200 of the illustrated example further includes example intermediate nodes 225A-B representing the example intermediate network devices 125 of FIG. 1B.

The example DAG 200 also includes edges (represented by directed lines in FIGS. 2A-2B) to represent the uplink, or upstream, communication paths between the devices represented by the nodes of the DAG 200. For example, the DAG 200 includes a first set of example edges 230A-D representing the example communication paths 130 between the example video sources 115 and the example intermediate network devices 125 of FIG. 1B. The DAG 200 of the illustrated example also includes a second set of example edges 235A-B representing the example communication paths 135 between the example intermediate network devices 125 and the example cloud computing platform 120 of FIG. 1B. (Although not shown, in some example, the DAG 200 can include additional set(s) of edges to represent additional communication paths between some or all of the intermediate network devices 125.)

In the example DAG 200 of FIGS. 2A-2B, the leaf nodes 215A-D and intermediate nodes 225A-B are associated with respective computing resource capacities corresponding to the respective devices they represent. (The computing resource capacities of the cloud computing platform 120 are assumed to have no impact on task assignment, in at least some examples.) For example, such computing resource capacities can include central processing unit (CPU) cycles, graphical processing unit (GPU) cycles, memory capacity, etc., available at the respective device for executing one or more video analytics tasks. In the example DAG 200, the edges 230A-D and 235A-B represent the connectivity between the nodes of the DAG 200, and are associated with respective bandwidth capacities specifying, for example, the amount of bandwidth available for carrying data associated with one or more video analytics tasks.

As illustrated in the examples of FIG. 2A-2B, a DAG, such as the example DAG 200, defines one respective uplink data path from each leaf node 215A-D (representing its respective video source 115) to the root node 220 (representing the cloud computing platform 120). For instance, in the example DAG 200, the leaf node 215A has one uplink data path to the root node 220, namely, from the leaf node 215A along the edge 230A to the intermediate node 225A, and from the intermediate node 225A along the edge 235A to the root node 220. Similarly, in the example DAG 200, the leaf node 215B has one uplink data path to the root node 220, namely, from the leaf node 215B along the edge 230B to the intermediate node 225A, and from the intermediate node 225A along the edge 235A to the root node 220. Similarly, in the example DAG 200, the leaf node 215C has one uplink data path to the root node 220, namely, from the leaf node 215C along the edge 230C to the intermediate node 225B, and from the intermediate node 225B along the edge 235B to the root node 220. Similarly, in the example DAG 200, the leaf node 215D has one uplink data path to the root node 220, namely, from the leaf node 215D along the edge 230D to the intermediate node 225B, and from the intermediate node 225B along the edge 235B to the root node 220.

FIG. 2A also illustrates the model ordering and parallelism properties of example video analytics tasks to be assigned by disclosed example distributed video analytics task assignment procedures to implement an example video analytics application 240 in the example cloud computing environment 100. In the illustrated example of FIG. 2A, the video analytics application 240 can be divided into three (3) tasks, such as an example video analytics task 245, an example video analytics task 250 and an example video analytics task 255, which are to be performed on respective video data generated at (or otherwise associated with) respective ones of the leaf nodes 215A-D of the DAG 200. Each of the video analytics processing tasks 245-255 is associated with a respective set of processing requirements, such as CPU cycles, GPU cycles, memory capacity, etc. Furthermore, the example video analytics task 245, the example video analytics task 250 and the example video analytics task 255 have a specific task ordering (which is represented in FIG. 2A by the directed lines in connecting the tasks 245, 250 and 255), which corresponds to the model ordering property of the example video analytics application 240.

Also, for a given leaf node 215A-D, the ordered sequence of example video analytics tasks 245-255 can often be performed in parallel in a pipelined manner such that earlier video data (e.g., video data associated with time t−1) associated with a given leaf node 215A-D can be processed by a video analytics task (e.g., the task 250) that is later in the ordered task sequence while later video data (e.g., video data associated with time t) associated with the same leaf node 215A-D can also be processed by a video analytics task (e.g., the task 245) that is earlier in the ordered task sequence. This is referred to as the model parallelism property of the example video analytics application 240. For example, the video analytics application 240 can correspond to the example license plate video analytics application 140 of FIG. 1B, with the example video analytics tasks 245-255 corresponding to the example license plate detection task 145, the example OCR task 150 and the example comparison task 155, respectively. As such, the example license plate detection task 145 exhibits model ordering and model parallelism properties similar to the example video analytics application 240. As another example, the video analytics application 240 can correspond to a facial recognition application, with the example video analytics tasks 245-255 corresponding to a skintone filtering task, a face detection task and a face identification task, respectively. As such, this facial recognition application exhibits model ordering and model parallelism properties similar to the example video analytics application 240.

FIG. 2B further illustrates the data parallelism property of example video analytics tasks to be assigned by disclosed example distributed video analytics task assignment procedures to implement an example video analytics application 240 in the example cloud computing environment 100. In the illustrated example of FIG. 2B, the example video analytics task 245, the example video analytics task 250 and the example video analytics task 255 of the video analytics application 240 are able to be performed in parallel on different video data generated at (or otherwise associated with) different ones of the leaf nodes 215A-D. For example, a first sequence of the video analytics tasks 245, 250 and 255, which is represented as a sequence of example video analytics tasks 245A, 250A and 255A in FIG. 2B, is performed on video data associated with the example leaf node 215A in parallel with a second sequence of the video analytics tasks 245, 250 and 255, which is represented as a sequence of example video analytics task 245B, 250B and 255B, being performed on video data associated with the example leaf node 215B. This processing can further be performed in parallel with a third sequence of the video analytics tasks 245, 250 and 255, which is represented as a sequence of example video analytics tasks 245C, 250C and 255C, being performed on video data associated with the example leaf node 215C. This processing can further be performed in parallel with a fourth sequence of the video analytics tasks 245, 250 and 255, which is represented as a sequence of example video analytics tasks 245D, 250D and 255D, being performed on video data associated with the example leaf node 215D.

Figure 3:
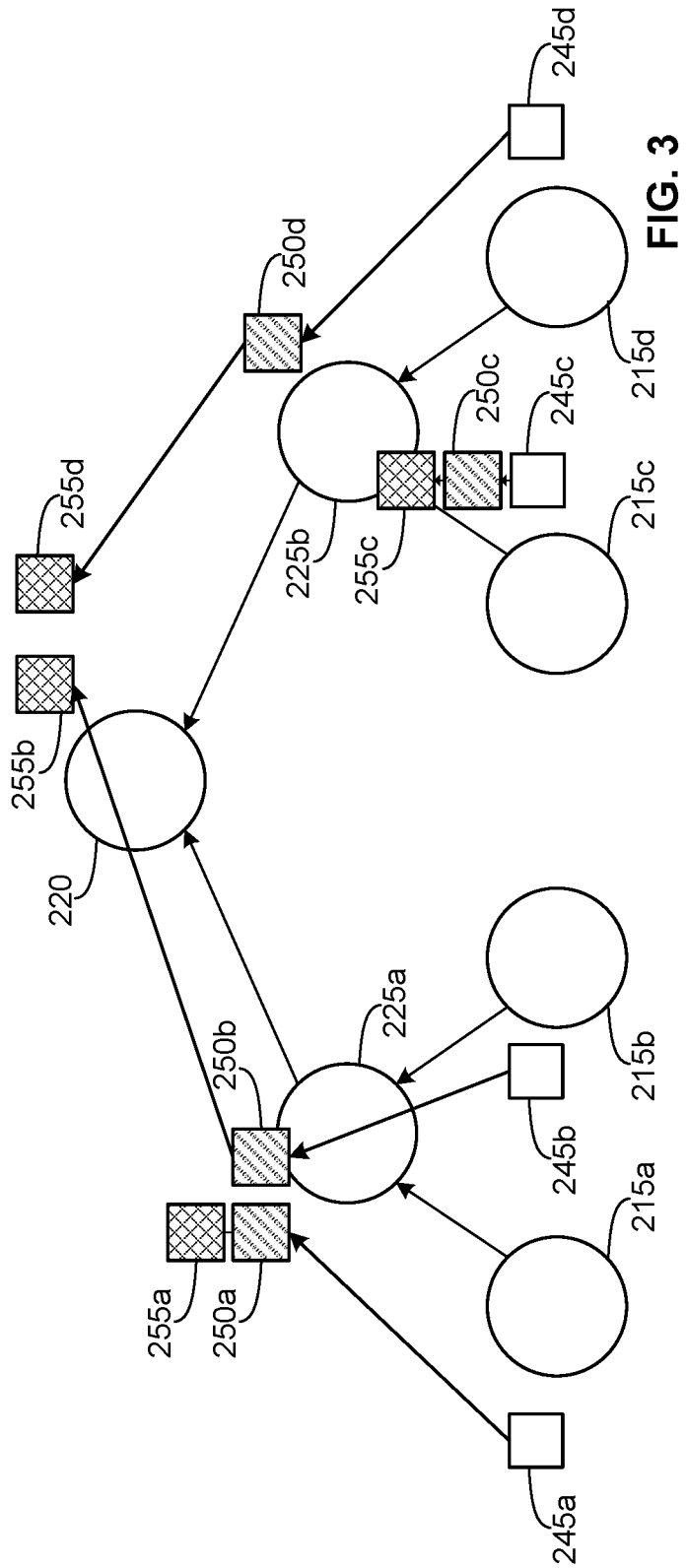
FIG. 3 illustrates an example distributed video analytics task assignment determined for the example cloud computing environment of FIG. 1B based on the example directed acyclic graph and the example model ordering, model parallelism and data parallelism properties of FIGS. 2A-2B.

An example distributed video analytics task assignment for implementing the example video analytics application 240 in the example cloud computing environment 100 of FIG. 1B, which can be determined using on the example DAG 200 and the model ordering, model parallelism and data parallelism properties of FIGS. 2A-2B in accordance with the teachings of this disclosure, is illustrated in FIG. 3. As disclosed in further detail below, the example distributed video analytics task assignment of FIG. 3 is determined by an example video analytics task scheduler disclosed herein to assign the video analytics tasks 245A-D, 250A-D and 255A-D of the example video analytics application 240 to combinations of one or more of the leaf nodes 215A-D, the intermediate nodes 225A-B and/or the root node 220 of the DAG 200 with an objective to reduce, or even minimize, the overall bandwidth (e.g., determined as a sum of the individual utilized bandwidths) utilized on the edges 230A-D and 235A-B of the DAG 200, while also satisfying the constraints that the computing resource and bandwidth capacities of the nodes 215A-D and 225A-B and the edges 230A-D and 235A-B are not exceeded by the computing resource and bandwidth requirements of the video analytics tasks 245A-D, 250A-D and 255A-D, and while satisfying the constraints that the video analytics tasks 245A-D, 250A-D and 255A-D are performed according to the model ordering, model parallelism and data parallelism properties of the example video analytics application 240.

In FIG. 3, this objective is met by the illustrated example distributed video analytics task assignment as follows. For the leaf node 215A (which corresponds to a first one of the video sources 115), the video analytics task 245A is executed by leaf node 215A, and the video analytics tasks 250A and 255A are executed by the intermediate node 225A (which corresponds to a first one of the intermediate network devices 125). For the leaf node 215B (which corresponds to a second one of the video sources 115), the video analytics task 245B is executed by leaf node 215B, and the video analytics tasks 250B is executed by the intermediate node 225A, and the video analytics tasks 255B is executed by the root node 220 (which corresponds to the cloud computing platform 120). For the leaf node 215C (which corresponds to a third one of the video sources 115), the video analytics tasks 245C, 250C and 255C are executed by leaf node 215C. For the leaf node 215D (which corresponds to a fourth one of the video sources 115), the video analytics task 245D is executed by leaf node 215D, and the video analytics tasks 250D is executed by the intermediate node 225B (which corresponds to a second one of the intermediate network devices 125), and the video analytics tasks 255D is executed by the root node 220. As illustrated in FIG. 3, the example distributed video analytics task assignment preserves the model ordering, model parallelism and data parallelism properties by ensuring, for example, that the sequence of video analytics tasks associated with a given leaf node 215A-D are performed in order along the respective uplink path from that leaf node to the root node 220, and that there are sufficient computing resources and bandwidth at the assigned nodes and along the corresponding edges to allow the tasks to be executed in parallel. For example, the illustrated example distributed video analytics task assignment assumes that node 225A has sufficient computing resources and output bandwidth to execute tasks 250A, 255A and 250B in parallel, and that node 215C has sufficient computing resources and output bandwidth to execute tasks 245C, 250C and 255C in parallel.

Figure 4:
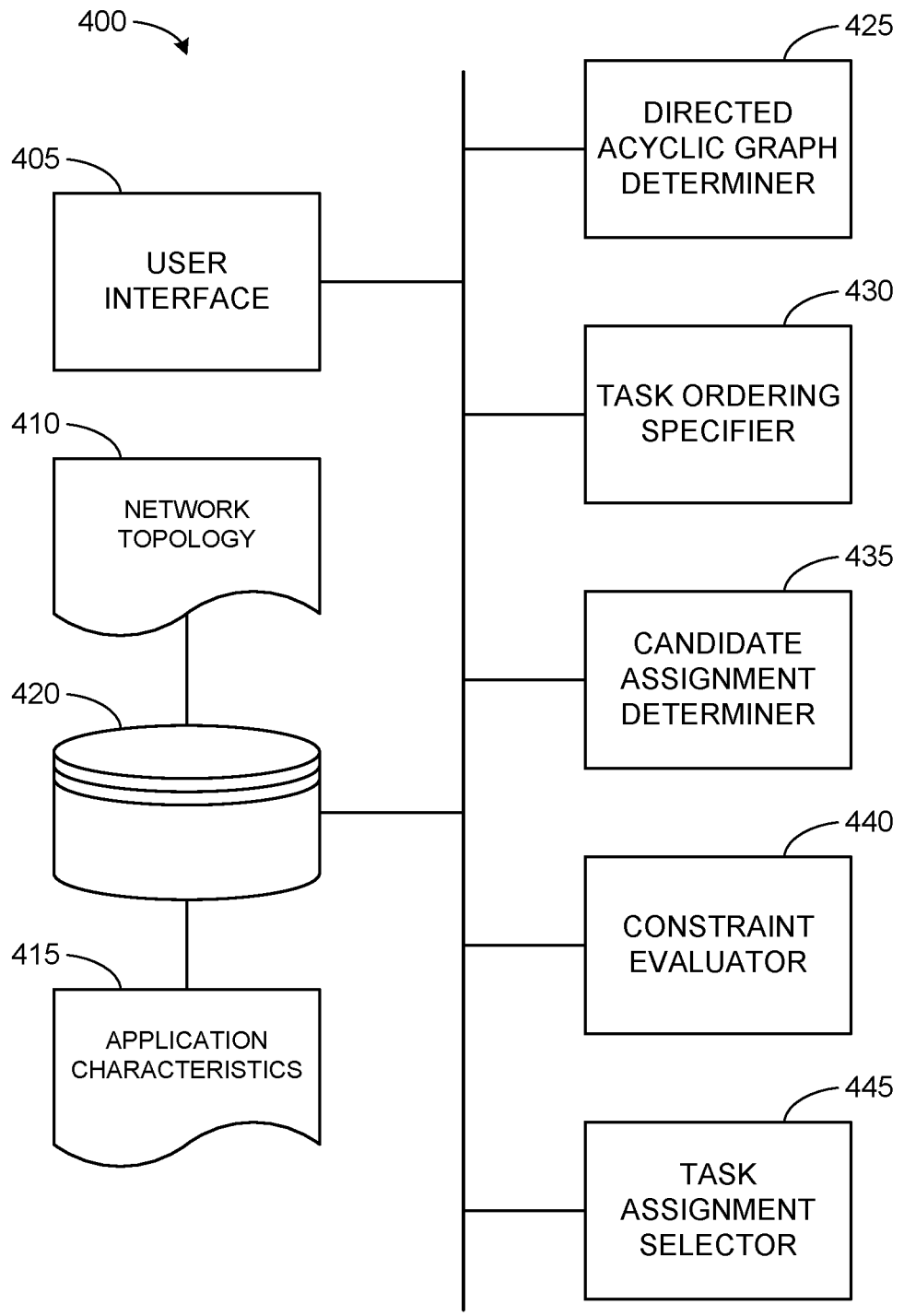
FIG. 4 is a block diagram of an example video analytics task scheduler that may be used to implement distributed assignment of video analytics processing tasks in the example cloud computing environment of FIG. 1B based on the example directed acyclic graph and the example model ordering, model parallelism and data parallelism properties of FIGS. 2A-2B to achieve the example distributed video analytics task assignment of FIG. 3.

A block diagram of an example video analytics task scheduler 400 structured to implement an example distributed video analytics task assignment procedure to assign video analytics tasks in cloud computing environments, such as the example cloud computing environment 100, in accordance with the teachings of this disclosure is illustrated in FIG. 4. The example video analytics task scheduler 400 of FIG. 4 includes an example user interface 405 to accept an example network topology 410 describing the example cloud computing environment 100 in which video analytics tasks are to be assigned for execution. The user interface 405 of the illustrated example also accepts example application characteristics 415 describing characteristics of the video analytics application whose video analytics tasks are to be assigned for execution in the cloud computing environment 100. As such, the example user interface 405 can be implemented by any number(s) and/or type(s) of interfaces, such as a graphical user interface (GUI) to accept user input data, a command line interface to accept user input data, a data interface to accept files, messages, etc., formatted to contain data specifying the network topology 410 and/or the application characteristics 415, etc.

In the illustrated example of FIG. 4, the network topology 410 includes data identifying the example video sources 115, the example intermediate network devices 125 and the example cloud computing platform 120. The example network topology 410 also includes data identifying the example communication paths 130 and 135, and specifying the architecture/layout of interconnections among the example video sources 115, the example intermediate network devices 125 and the example cloud computing platform 120 using the communication paths 130 and 135. The example network topology 410 of the illustrated example further specifies the computing resource capacities (e.g., CPU cycles, GPU cycles, memory capacity, etc., available for executing one or more video analytics tasks) of the example video sources 115 and the example intermediate network devices 125, and the bandwidth capacities (amount of bandwidth available for carrying data associated with one or more video analytics tasks) of the communication paths 130 and 135. As such, the network topology 410 can be represented in any data format, such as a binary file, a text file, a database, etc.

In the illustrated example, the application characteristics 415 include data identifying sequences of video analytics tasks, such as the example tasks 245A-D, 250A-D, 255A-D, included in the video analytics application to be executed in the cloud computing environment 100. The example application characteristics 415 also include data specifying task orderings (or, in other words, the model orderings) for the sequences of video analytics tasks. (In the illustrated example, the video analytics tasks are presumed to exhibit the model and data parallelism properties described above.). The example application characteristics 415 of the illustrated example further include data specifying the processing requirements (e.g., CPU cycles, GPU cycles, memory capacity, etc.) for respective ones of the video analytics tasks (e.g., such as the processing requirements for respective ones of the video analytics tasks 245A-D, 250A-D, 255A-D. As such, the application characteristics 415 can be represented in any data format, such as a binary file, a text file, a database, etc.

The example video analytics task scheduler 400 further includes example storage 420 to store the example network topology 410 and the example application characteristics 415 obtained by the user interface 405. The example storage 420 can be implemented by any number(s) and/or type(s) of storage and/or memory device, a database, etc. For example, the storage 420 can be implemented by the mass storage device 1128 and/or the volatile memory 1114 included in the example processing system 1100 of FIG. 11, which is described in greater detail below.

The video analytics task scheduler 400 of the illustrated example includes an example directed acyclic graph determiner 425 to determine a directed acyclic graph, such as the example DAG 200, for the example cloud computing environment 100 based on the example network topology 410. For example, the directed acyclic graph determiner 425 accesses the network topology 410 from the storage 420 and constructs a DAG, such as the DAG 200, having example nodes 215A-D, 225A-B and 220 corresponding, respectively, to the example video sources 115, the example intermediate network devices 125 and the example cloud computing platform 120 identified in the example network topology 410. The directed acyclic graph determiner 425 also constructs the DAG 200 to interconnect the nodes 215A-D, 225A-B and 220 with example edges 230A-D and 235A-B corresponding, respectively, to the example communication paths 130 and 135 identified in the example network topology 410.

Stated mathematically, the example directed acyclic graph determiner 425 determines a DAG, $G_d$, represented as $G_d = \langle V_d, E_d \rangle$, where $V_d$ represents the set of nodes (e.g., nodes 215A-D, 225A-B and 220) corresponding to the example devices (e.g., devices 115, 125 and 120) included in the example cloud computing environment 100, and $E_d$ represents the set of edges (e.g., edges 230A-D and 235A-B) corresponding to the example communication paths (e.g., the communication paths 130 and 135) included in the example cloud computing environment 100, and which connects the nodes $V_d$ in accordance with the network topology 410. The DAG $G_d = \langle V_d, E_d \rangle$ determined by the example directed acyclic graph determiner 425 also includes, for each node $V_d$, a function $f_d: V_d \to R$ that represents the computing resource capacity specified in the network topology 410 for the device corresponding to that node $V_d$. The DAG $G_d = \langle V_d, E_d \rangle$ determined by the example directed acyclic graph determiner 425 further includes, for each edge $E_d$, a function $g_d: E_d \to R$ that represents the bandwidth capacity specified in the network topology 410 for the communication path corresponding to that node edge $E_d$. In the illustrated example, the functions $f_d: V_d \to R$ and $g_d: E_d \to R$ map, respectively, the specified computing resource capacities and bandwidth capacities to real numbers for further use by the example video analytics task scheduler 400, as described in detail below. However, in other example, the functions $f_d: V_d$ and/or $g_d: E_d$ could map the specified computing resource capacities and/or bandwidth capacities to compound data types.

The video analytics task scheduler 400 of the illustrated example also includes an example task ordering specifier 430 to specify a task ordering for the sequences of video analytics tasks identified in the application characteristics 415. For example, the task ordering specifier 430 accesses the application characteristics 415 from the storage 420 and uses that data to specify task orderings of the respective sequences of video analytics tasks 245A-D, 250A-D, 255A-D, to be performed on video source data generated or otherwise obtained at the video sources 115 corresponding to the leaf nodes of the DAG determined by the directed acyclic graph determiner 425. Stated mathematically, the example task ordering specifier 430 determines task orderings, $G_s$, represented as $G_s = \langle V_s, E_s \rangle$, which is a totally ordered set in which $V_s$ represents the set of video analytics tasks 245A-D, 250A-D, 255A-D (also referred to as jobs) to be executed in the example cloud computing environment 100, and $E_s$ represents the dependencies/communication between the sequences of the video analytics tasks $V_s$. The task ordering $G_s = \langle V_s, E_s \rangle$ determined by the example task ordering specifier 430 also includes, for each task $V_s$, a function $f_s: V_s \to R$ that represents the computing resource requirements specified in the application characteristics 415 for that task $V_s$. The task ordering $G_s = \langle V_s, E_s \rangle$ determined by the example task ordering specifier 430 further includes, for each task interdependency $E_s$, a function $g_s: E_s \to R$ that represents the bandwidth requirements associated with that task interdependency $E_s$. In the illustrated example, the functions $f_s: V_s \to R$ and $g_s: E_s \to R$ map, respectively, the specified computing resource requirements and bandwidth requirements to real numbers for further use by the example video analytics task scheduler 400, as described in detail below. However, in other example, the functions $f_s: V_s$ and/or $g_s: E_s$ could map the specified computing resource capacities and/or bandwidth capacities to compound data types.

The video analytics task scheduler 400 of the illustrated example further includes an example candidate assignment determiner 435, an example constraint evaluator 440 and an example task assignment selector 445 to implement an example distributed video analytics task assignment procedure in accordance with the teachings of this disclosure. In the illustrated example, the distributed video analytics task assignment procedure implemented by the candidate assignment determiner 435, the constraint evaluator 440 and the task assignment selector 445 assigns combinations of the video sources 115, the intermediate network devices 125 and the cloud computing platform 120 specified in the network topology 410 to execute the respective sequences of video analytics tasks specified in the application characteristics 415, with the assignment based on the DAG determined by the directed acyclic graph determiner 425 and the task orderings determined by the task ordering specifier 430. Furthermore, the distributed video analytics task assignment procedure implemented by the candidate assignment determiner 435, the constraint evaluator 440 and the task assignment selector 445 operates to perform such a task assignment to reduce (or even minimize) an overall bandwidth utilized by the sequences of video analytics processing tasks in the cloud computing environment 100.

An example distributed video analytics task assignment procedure 500 implemented by the example candidate assignment determiner 435, the example constraint evaluator 440 and the example task assignment selector 445 of the example video analytics task scheduler 400 of FIG. 4 is illustrated in FIGS. 5-9. Turning to FIG. 5, the distributed video analytics task assignment procedure 500, which is also referred to as the example task assignment procedure 500, yields a task assignment that assigns combinations of the devices 115-125 in the cloud computing environment 100 to execute the respective sequences of video analytics tasks specified in the application characteristics 415, with the task assignment based on the DAG determined by the directed acyclic graph determiner 425 and the task orderings determined by the task ordering specifier 430. The task assignment procedure 500 of the illustrated example further operates to determine an output task assignment such that an example upstream cost 505 is reduced, or minimized, relative other possible candidate task assignment, while ensuring the output task assignment satisfies a set of example constraints 510-525.

Figure 6:
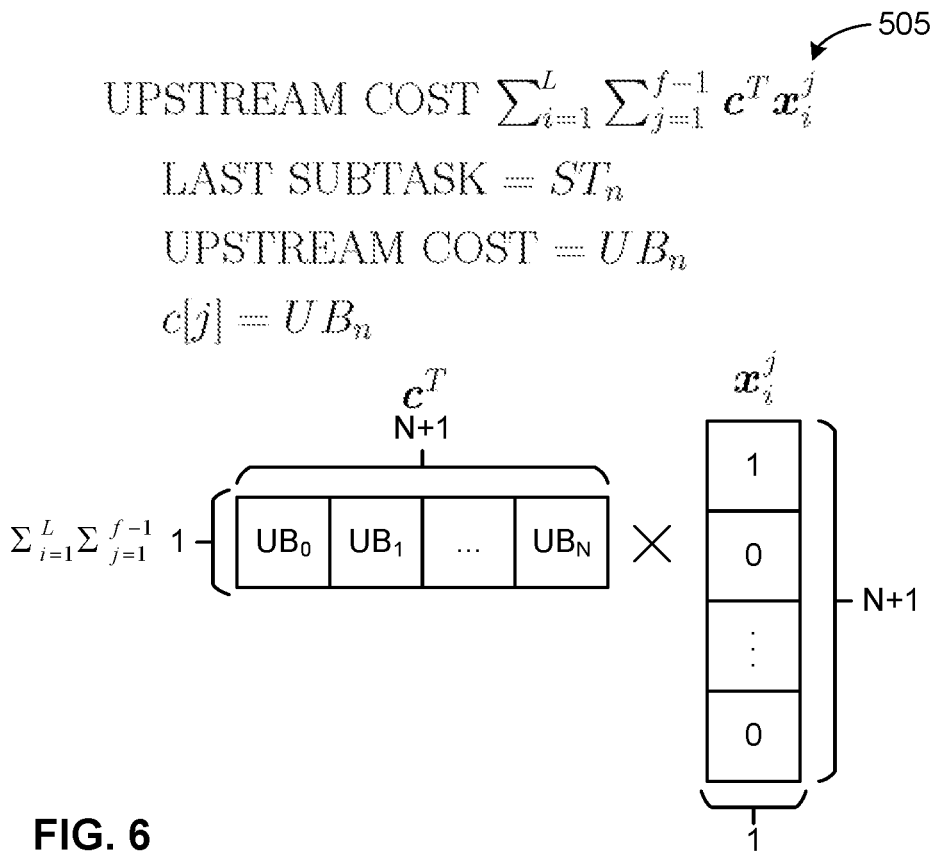
FIG. 6 illustrates an example implementation of an example cost function to be evaluated by the example video analytics task scheduler of FIG. 4 when performing the example task assignment procedure of FIG. 5.
Figure 7:
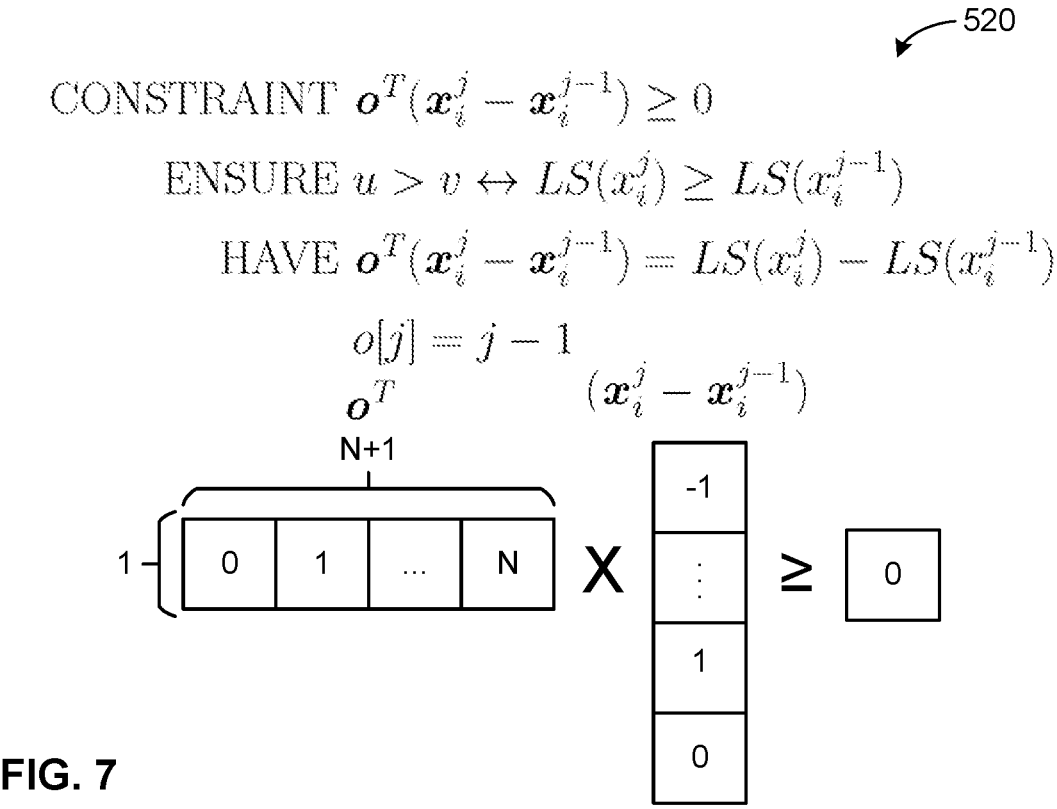
FIG. 7 illustrates an example implementation of an example task ordering constraint to be satisfied by the example video analytics task scheduler of FIG. 4 when performing the example task assignment procedure of FIG. 5.

For example, the upstream cost 505, which is further illustrated in FIG. 6, defines a metric representing the overall bandwidth utilized by the respective sequences of video analytics tasks specified in the application characteristics 415 when assigned to the devices 115-125 in the cloud computing environment 100 according to the output task assignment. In the illustrated example, the constraint functions 510-525 include an example resource utilization constraint 510, an example bandwidth utilization constraint 515, an example ordering constraint 520 and an example single choice constraint 525. The example resource utilization constraint 510, which is further illustrated in FIG. 8, ensures that the output task assignment determined by task assignment procedure 500 ensure available processing resources represented by the leaf nodes and the intermediate nodes of the DAG determined by the directed acyclic graph determiner 425 (and which correspond to the available processing resources of the devices 115-125 represented by those nodes) are not exceeded by the output task assignment. The example bandwidth utilization constraint 515, which is further illustrated in FIG. 9, ensures available bandwidths represented by the sets of edges of the directed acyclic graph (and which correspond to the available bandwidths of the communication paths 130-135 represented by those edges) are not exceeded by the output task assignment. The example ordering constraint 520, which is further illustrated in FIG. 7, ensures that the respective sequence of video analytics tasks specified in the application characteristics 415 for a particular path are assigned to a combination of nodes of the DAG that are included in the uplink path for that video source in a manner that preserves the task ordering for that respective sequence of video analytics tasks. The example single choice constraint 525 ensures that each node of the DAG in the uplink path for a given video source outputs data for only one of the tasks in that source's sequence of video analytics tasks. The combination of the ordering constraint 520 and the single choice constraint 525 provide that multiple video analytics tasks for a given video source can be assigned to one node of the DAG (corresponding to the device 115-125 represented by that node), but the tasks will be performed in order and only the last task in the group will output data from the node. In the illustrated example task assignment procedure 500, it is assumed that tasks ordered later in the task ordering for a particular sequence of video analytics tasks are associated with lower bandwidth utilization than tasks ordered earlier in the task ordering for the particular sequence of video analytics tasks.

Definitions of some of the variables utilized by the example task assignment procedure 500 are provided in Table 1.

TABLE 1

| Variable | Definition |
|---|---|
| M | Number of devices 115-125 included in the cloud computing environment 100(which also corresponds to the number of nodes in the DAG) |
| L | Number of video source devices 115 included in the cloud computing environment 100 (which also corresponds to the number of leaf nodes in the DAG) |
| f | The depth of the DAG, which corresponds to the maximum number of levels from an leaf node to the root node in the DAG (e.g., f = 3 for the example DAG 200 of FIGS. 2A-2B, but other example DAGs could have other numbers of levels of nodes) |
| N | Number of tasks in a sequence of video analytics tasks to be performed on video data from a given video source |
| $x_i^j$ | A last task assignment vector representing the last task in the sequence of video analytics tasks assigned to the $j^{th}$ device in the uplink data path of the DAG for the $i^{th}$ video source |
| $ST_n$ | The $n^{th}$ task in the sequence of video analytics tasks; thus, the sequence of tasks can be represented by the ordered sequence T: $ST_1 \rightarrow ST_2 \rightarrow \ldots \rightarrow ST_N$ |
| $UB_n$ | The bandwidth required by the $n^{th}$ task in the sequence of video analytics tasks |
| $sr_n$ | The computing resources required by the $n^{th}$ task in the sequence of video analytics tasks |

As noted in Table 1, the sequence of video analytics tasks ($ST_n$) to be performed for a given video source is represented by the ordered sequence T: $ST_1 \rightarrow ST_2 \rightarrow \ldots \rightarrow ST_N$. The example task assignment procedure 500 of FIG. 5 also defines dummy tasks, $ST_0$, which represents generation of the raw video data by the respective video source. The dummy tasks are associated with respective required bandwidths $UB_0$ that correspond to the required bandwidths for the raw video data generated by the respective video sources. The dummy tasks are also associated with computing resource requirements of zero. The example task assignment procedure 500 inserts these dummy tasks at the initial positions of the respective sequences of video analytics tasks for the respective video sources. For a given video source, this modified sequence of video analytics tasks can be represented by the ordered sequence T': $ST_0 \rightarrow ST_1 \rightarrow ST_2 \rightarrow \ldots \rightarrow ST_N$. The example task assignment procedure 500 uses these modified sequences of video analytics tasks, which include the dummy tasks $ST_0$, to evaluate matrix-based equations representing the example resource utilization constraint 510 and the example bandwidth utilization constraint 515, which are discussed in further detail below.

Execution of the example task assignment procedure 500 by the example candidate assignment determiner 435, the example constraint evaluator 440 and the example task assignment selector 445 of the example video analytics task scheduler 400 of FIG. 4 is now described. In some examples, the candidate assignment determiner 435, the constraint evaluator 440 and the task assignment selector 445 implement the example task assignment procedure 500 with integer linear programming. For convenience, but without loss of generality, it is assumed that the directed acyclic graph determiner 425 determined the example DAG 200 of FIGS. 2A-2B and 3 to represent the cloud computing environment 100, and the task orderings determined by the task ordering specifier 430 correspond to the respective sequences of tasks 245A-D, 250A-D and 255 A-D illustrated in FIGS. 2A-2B and 3. The candidate assignment determiner 435 of the illustrated example iteratively determines respective candidate assignments that assign DAG nodes to execute tasks in the respective sequences of video analytics tasks for the respective video sources.

For example, for a given video source 115, such as the source corresponding to leaf node 215a in the DAG 200, the respective sequence of video analytics tasks T: $ST_1 \rightarrow ST_2 \rightarrow ST_3$ for that leaf node is the ordered sequence of tasks T: {245a→250a→255a}. The candidate assignment determiner 435 of the illustrated example determines a candidate assignment of nodes to execute this sequence of video analytics tasks T: {245a→250a→255a} by using the DAG 200 to identify the combination of nodes in the uplink path from leaf node 215a to the root node 220 corresponding to the cloud computing platform 120, which in this example is the ordered combination of nodes {215a, 225a, 220}. Then, for the video source 115 corresponding to leaf node 215a, the candidate assignment determiner 435 assigns at least some (e.g., one or more) of the combination of nodes {215a, 225a, 220} to execute the sequence of video analytics tasks T: {245a→250a→255a} in a manner that preserves the task ordering along the uplink path defined by the ordered combination of nodes {215a, 225a, 220}. For example, the candidate assignment determiner 435 could assign the node 215a to execute the task 245a, assign the node 225a to execute the tasks 250a and 255a in order, and not assign any tasks to the root node 220, as shown in the example of FIG. 3. For a given processing iteration, the example candidate assignment determiner 435 would continue to determine candidate task assignments in a similar manner for the other ones of the video sources 115 represented by the other leaf nodes 215b-d in the DAG 200.

In some examples, the candidate assignment determiner 435 utilizes the last task assignment vector $x_i^j$ defined in Table 1 to determine, for a given processing iteration, the respective candidate task assignment associated with a given leaf node of the DAG 200. As noted in Table 1, the last task assignment vector $x_i^j$ is a vector representing the last task in the sequence of video analytics tasks assigned to the $j^{th}$ device in the uplink data path of the DAG for the $i^{th}$ video source. In some examples, for each node in the uplink data path from a given leaf node to the root node of the DAG 200, the candidate assignment determiner 435 determines a last task in the sequence of video analytics tasks to be processed by that node. Then, for nodes at adjacent positions in the uplink data path, the candidate assignment determiner 435 looks at the last task assigned to the preceding node and the last task assigned to the subsequent node and assigns any intervening video analytics tasks in the sequence to the subsequent node.

For example, if the leaf node 215a of the DAG 200 corresponds to i=1, and the ordered combination of nodes {215a, 225a, 220} corresponds to j={1, 2, 3}, then in such an example, the candidate assignment determiner 435 would determine the last task assignment vector $x_1^1$ for node 215a to be $x_1^1 = [1\ 0\ 0]^T$, where the first position in the vector corresponds to the first task (245a) in the sequence, the second position corresponds to the second task (250a) in the sequence, and the third position corresponds to the third task (255a) in the sequence. Thus, the last task assignment vector $x_1^1 = [1\ 0\ 0]^T$ indicates that the task 245a is the last task in the sequence for leaf node 215a (i=1) to be executed by node 215a (j=1). Continuing, in this example, the candidate assignment determiner 435 would determine the last task assignment vector $x_1^2$ for node 225a to be $x_1^2 = [0\ 0\ 1]^T$, which indicates that the task 255a is the last task in the sequence for leaf node 215a (i=1) to be executed by node 225a (j=2). In this example, the candidate assignment determiner 435 would then assign any intervening tasks between the last task to be executed by node 215a (j=1) and the last task to be executed by node 225a (j=2) for execution by node 225a (j=2), which is at the subsequent position along the uplink data path for leaf node 225a. Thus, in this example, the candidate assignment determiner 435 would also assign task 250a for execution by the node 225a (j=2).

After the candidate assignment determiner 435 determines the candidate task assignments of respective combinations of nodes of the DAG 200 to execute the respective sequences of video analytics tasks associated with the respective video sources represented by the leaf nodes of the DAG, the example constraint evaluator 440 determines whether the example resource utilization constraint 510 and the example bandwidth utilization constraint 515 are satisfied for the candidate task assignments. (In the illustrated example, the candidate assignment determiner 435 ensures that the example ordering constraint 520 and the example single choice constraint 525 are satisfied for the candidate task assignments.) The example resource utilization constraint 510 ensures that the respective resources capacities, represented by $R_1, \ldots, R_M$, for the M devices in the cloud computing environment 100 are not exceeded by the combination of candidate task assignments for the respective video sources. The example bandwidth utilization constraint 515 ensures that the respective bandwidth capacities, represented by $U_1, \ldots, U_M$, for the M of the respective communication paths at the outputs of the M devices in the cloud computing environment 100 are not exceeded by the combination of candidate task assignments for the respective video sources.

As illustrated in the example of FIG. 8, the example constraint evaluator 440 evaluates an example matrix-based equation to determine whether the resource utilization constraint 510 is satisfied. Evaluation of the matrix-based equation for the resource utilization constraint 510 involves multiplying a matrix $Ar_i^j$ by the vector $(x_i^j - x_i^{j-1})$ at each node in the DAG in the uplink path (i) and DAG level (j) associated the leaf node (i) in the DAG 200. The matrix $Ar_i^j$ is an M×(N+1) matrix, with the rows corresponding to respective nodes in the DAG 200 (representing the devices in the cloud computing environment 100), and the columns corresponding to the computing resource requirements for the sequence of analytics processing tasks to be performed on the video source data generated by leaf nodes (i). The matrix $Ar_i^j$ is a sparse matrix, with the rows having zero values unless the particular row of the matrix corresponds to the device at the (i, j) position in the DAG 200 (e.g., if $D_j^{(i)}=D_k$ in FIG. 9). The vector $(x_i^j-x_i^{j-1})$ is the difference between the last task assignment vectors at the adjacent positions j and (j−1) in the DAG 200. As shown in FIG. 8, the constraint evaluator 440 evaluates the matrix $Ar_i^j$ multiplied by the vector $(x_i^j-x_i^{j-1})$ over all the uplink paths for the leaf nodes (i) and over all the levels (j) of the DAG 200 and sums the results to determine the amount of computing resources to be utilized by the combination of candidate task assignments at each device in the cloud computing environment 100. If the computing resource capacities of none of the devices are exceeded by the computing resources to be utilized by the combination of candidate task assignments, then the constraint evaluator 440 determines the resource utilization constraint 510 is satisfied. Otherwise, if any of the computing resource capacities of the devices are exceeded, the constraint evaluator 440 determines the resource utilization constraint 510 is not satisfied.

As illustrated in the example of FIG. 9, the example constraint evaluator 440 evaluates another example matrix-based equation to determine whether the bandwidth utilization constraint 515 is satisfied. Evaluation of the matrix-based equation for the bandwidth utilization constraint 515 involves multiplying a matrix $Ae_i^j$ by the vector $x_i^j$ at each node in the DAG in the uplink path (i) and DAG level (j) associated the leaf node (i) in the DAG 200. The matrix $Ae_i^j$ is an M×(N+1) matrix, with the rows corresponding to respective nodes in the DAG 200 (representing the devices in the cloud computing environment 100), and the columns corresponding to the bandwidth requirements for the sequence of analytics processing tasks to be performed on the video source data generated by leaf nodes (i). The matrix $Ae_i^j$ is a sparse matrix, with the rows having zero values unless the particular row of the matrix corresponds to the device at the (i,j) position in the DAG 200 (e.g., if $D_j^{(i)}=D_k$ in FIG. 9). The vector $x_i^j$ is the last task assignment vector for the node at the position j in the DAG 200. As shown in FIG. 9, the constraint evaluator 440 evaluates the matrix $Ae_i^j$ multiplied by the vector $x_i^j$ over all the uplink paths for the leaf nodes (i) and over all the levels (j) of the DAG 200 and sums the results to determine the amount of bandwidth to be utilized by the combination of candidate task assignments at the output of each device in the cloud computing environment 100. If the bandwidth capacities of none of the paths at the outputs of the devices are exceeded by the bandwidth to be utilized by the combination of candidate task assignments, then the constraint evaluator 440 determines the bandwidth utilization constraint 515 is satisfied. Otherwise, if any of the bandwidth capacities are exceeded, the constraint evaluator 440 determines the bandwidth utilization constraint 515 is not satisfied.

Assuming the constraint evaluator 440 determines the resource utilization constraint 510 and the bandwidth utilization constraint 515 are satisfied for a given combination of candidate task assignments, the example task assignment selector 445 then evaluates the example upstream cost 505 for the combination of candidate task assignments. As illustrated in the example of FIG. 6, the example task assignment selector 445 evaluates another example matrix-based equation to determine the upstream cost 505 of the given combination of candidate task assignments determined for the current processing iteration. In the illustrated example of FIG. 6, the upstream cost 505 corresponds to the overall bandwidth utilized by the combination of candidate task assignments in the cloud computing environment 100, but additional and/or alternative costs can be evaluated by the task assignment selector 445. Evaluation of the matrix-based equation for the upstream cost 505 involves multiplying a vector c by the vector $x_i^j$ at each node in the DAG in the uplink path (i) and DAG level (j) associated the leaf node (i) in the DAG 200. The vector c is an (N+1)×1 vector, with the elements corresponding to the respective bandwidths utilized by the respective tasks in the modified task sequence $T':ST_0 \rightarrow ST_1 \rightarrow ST_2 \rightarrow \ldots \rightarrow ST_N$. The vector $x_i^j$ is the last task assignment vector for the node at the position j in the DAG 200. As shown in FIG. 6, the constraint evaluator 440 evaluates the vector c multiplied by the vector $x_i^j$ over all the uplink paths for the leaf nodes (i) and over all the levels (j) of the DAG 200 and sums the results to determine the overall amount of bandwidth to be utilized by the combination of candidate task assignments in the cloud computing environment 100.

In the illustrated example, the task assignment selector 445 compares the upstream cost 505 determined for the combination of candidate task assignments determined in the current processing iterations with the upstream cost 505, if any, for another combination of candidate task assignments determined in a prior processing iteration. If the combination of candidate task assignments for the current processing iteration results in a reduced upstream cost 505, the task assignment selector 445 retains the current combination of candidate task assignments and discards the prior combination. In some examples, the task assignment selector 445 repeats this processing for each iteration of the candidate assignment determiner 435 determining a different combination of candidate task assignments. After the processing iterations are completed, the task assignment selector 445 will have retained the combination of candidate task assignments yielding the best (e.g., lowest or minimum) upstream cost 505. The task assignment selector 445 outputs this combination of candidate task assignments as the resulting distributed assignment 110 for assigning the respective sequences of video analytics tasks identified in the application characteristics 415 to the devices 115, 125 and 120 in the cloud computing environment 100. For example, the task assignment selector 445 can display and/or otherwise output the resulting distributed assignment 110 via the user interface 405. Additionally or alternatively, in some examples, the task assignment selector 445 outputs, via one or more commands, messages, configuration files, etc., the resulting distributed assignment 110 to the devices 115, 125 and 120 in the cloud computing environment 100 to configure the devices 115, 125 and 120 to execute their respective assigned video analytics processing tasks, if any.

While an example manner of implementing the example video analytics task scheduler 400 is illustrated in FIG. 4, one or more of the elements, processes and/or devices illustrated in FIG. 4 may be combined, divided, re-arranged, omitted, eliminated and/or implemented in any other way. Further, the example user interface 405, the example network topology 410, the example application characteristics 415, the example storage 420, the example directed acyclic graph determiner 425, the example task ordering specifier 430, the example candidate assignment determiner 435, the example constraint evaluator 440, the example task assignment selector 445 and/or, more generally, the example video analytics task scheduler 400 of FIG. 4 may be implemented by hardware, software, firmware and/or any combination of hardware, software and/or firmware. Thus, for example, any of the example user interface 405, the example network topology 410, the example application characteristics 415, the example storage 420, the example directed acyclic graph determiner 425, the example task ordering specifier 430, the example candidate assignment determiner 435, the example constraint evaluator 440, the example task assignment selector 445 and/or, more generally, the example video analytics task scheduler 400 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video analytics task scheduler 400, the example user interface 405, the example network topology 410, the example application characteristics 415, the example storage 420, the example directed acyclic graph determiner 425, the example task ordering specifier 430, the example candidate assignment determiner 435, the example constraint evaluator 440 and/or the example task assignment selector 445 is/are hereby expressly defined to include a tangible computer readable storage device or storage disk such as a memory, a digital versatile disk (DVD), a compact disk (CD), a Blu-ray disk, etc. storing the software and/or firmware. Further still, the example video analytics task scheduler 400 may include one or more elements, processes and/or devices in addition to, or instead of, those illustrated in FIG. 4, and/or may include more than one of any or all of the illustrated elements, processes and devices.

Figure 10:
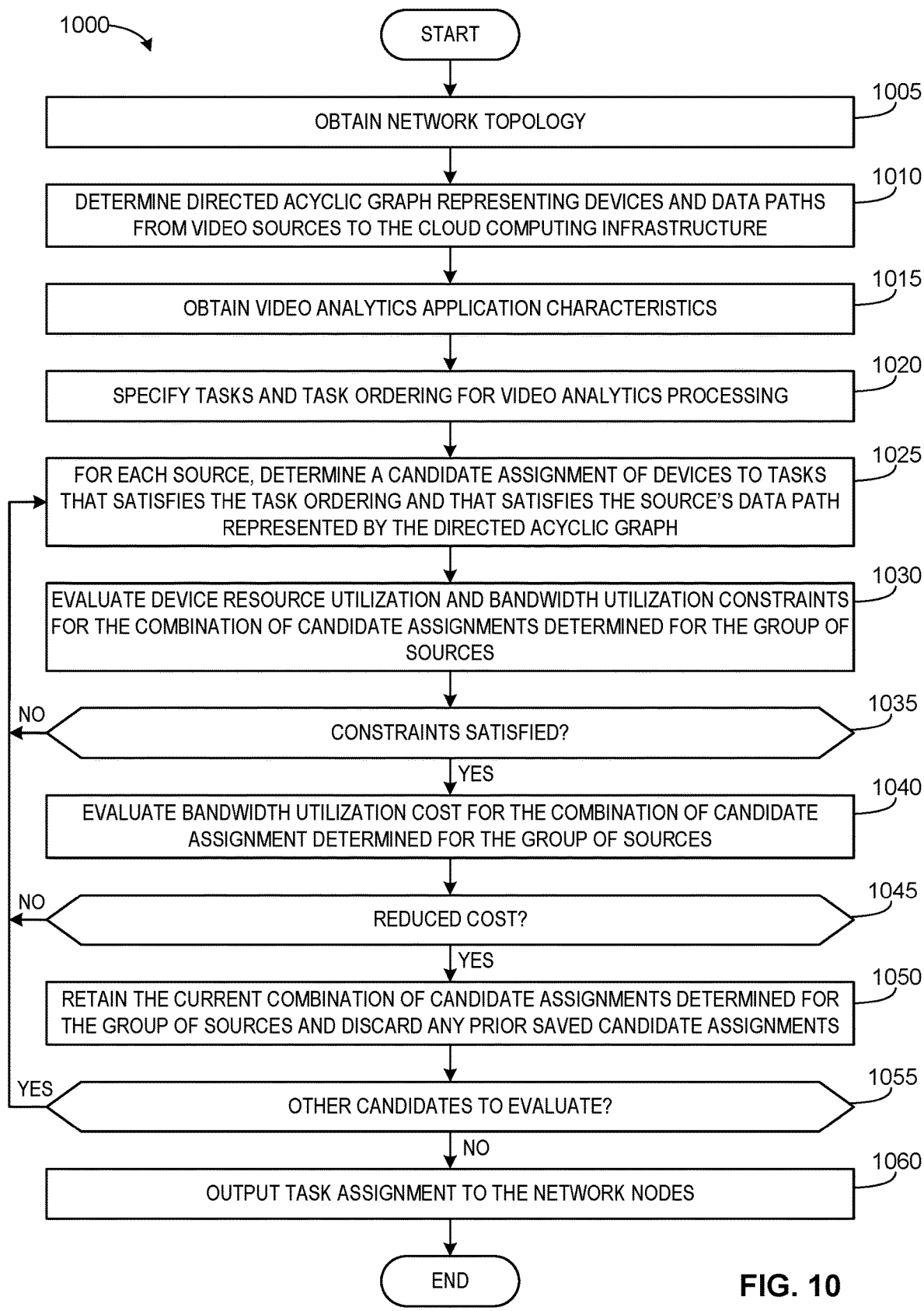
FIG. 10 is a flowchart representative of example machine readable instructions that may be executed to implement the example video analytics task scheduler of FIG. 4 and/or to perform the example task assignment procedure of FIG. 5.

A flowchart representative of an example process for implementing the example video analytics task scheduler 400, the example user interface 405, the example network topology 410, the example application characteristics 415, the example storage 420, the example directed acyclic graph determiner 425, the example task ordering specifier 430, the example candidate assignment determiner 435, the example constraint evaluator 440 and/or the example task assignment selector 445 is shown in FIG. 10. In some examples, the machine readable instructions comprise one or more programs for execution by a processor, such as the processor 1112 shown in the example processor platform 1100 discussed below in connection with FIG. 11. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1112, but the entire program or programs and/or portions thereof could alternatively be executed by a device other than the processor 1112 and/or embodied in firmware or dedicated hardware (e.g., implemented by an ASIC, a PLD, an FPLD, discrete logic, etc.). Further, although the example hardware operations and/or machine readable instructions are described with reference to the flowchart illustrated in FIG. 10, many other methods of implementing the example video analytics task scheduler 400, the example user interface 405, the example network topology 410, the example application characteristics 415, the example storage 420, the example directed acyclic graph determiner 425, the example task ordering specifier 430, the example candidate assignment determiner 435, the example constraint evaluator 440 and/or the example task assignment selector 445 may alternatively be used. For example, with reference to the flowchart illustrated in FIG. 10, the order of execution of the blocks may be changed, and/or some of the blocks described may be changed, eliminated, combined and/or subdivided into multiple blocks.

As mentioned above, the example process of FIG. 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 10 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 1000 may be executed to implement the example video analytics task scheduler 400, is illustrated in FIG. 10. With reference to the preceding figures and associated written descriptions, the example program 1000 of FIG. 10 begins execution at block 1005 at which the example user interface 405 of the video analytics task scheduler 400 obtains the network topology 410 for the cloud computing environment 100, as described above. At block 1010, the example directed acyclic graph determiner 425 of the video analytics task scheduler 400 uses the network topology 410 to determine, as described above, a directed acyclic graph, such as the example DAG 200, representing the devices and uplink data paths from the video sources 115 to the cloud computing platform 120 of the cloud computing environment 100. At block 1015, the example user interface 405 obtains, as described above, the application characteristics 415 specifying the respective sequences of video analytics processing tasks to be executed in the cloud computing environment 100 on the video data associated with the respective video sources 115. At block 1020, the example task ordering specifier 430 of the video analytics task scheduler 400 determines task orderings for the respective sequences of video analytics processing tasks specified in the application characteristics 415.

Next, at block 1025, the example candidate assignment determiner 435 of the video analytics task scheduler 400 begins a set of processing iterations to determine respective candidate assignments that assign nodes of the DAG 200 to execute tasks in the respective sequences of video analytics tasks for the respective video sources 115. For example, and as described above, at block 1025 the candidate assignment determiner 435 determines, for each video source 115 represented by an leaf node of the DAG 200, a respective candidate assignment of the devices in the cloud computing environment 100 to the tasks in the sequence of video analytics tasks for that source such that the candidate assignment satisfies the task ordering for the sequence of video analytics tasks along the source's uplink data path in the DAG 200. At block 1030, the example constraint evaluator 440 of the video analytics task scheduler 400 determines, as described above, whether the example resource utilization constraint 510 and the example bandwidth utilization constraint 515 are satisfied for the combination of candidate task assignments determined at block 1025 for the group of video sources 115 in the cloud computing environment 100. If the constraints are not satisfied (block 1035), processing returns to block 1025 at which the candidate assignment determiner 435 determines a different combination of candidate task assignments for the group of video sources 115. However, if the constraints are satisfied (block 1035), processing proceeds to block 1040.

Figure 11:
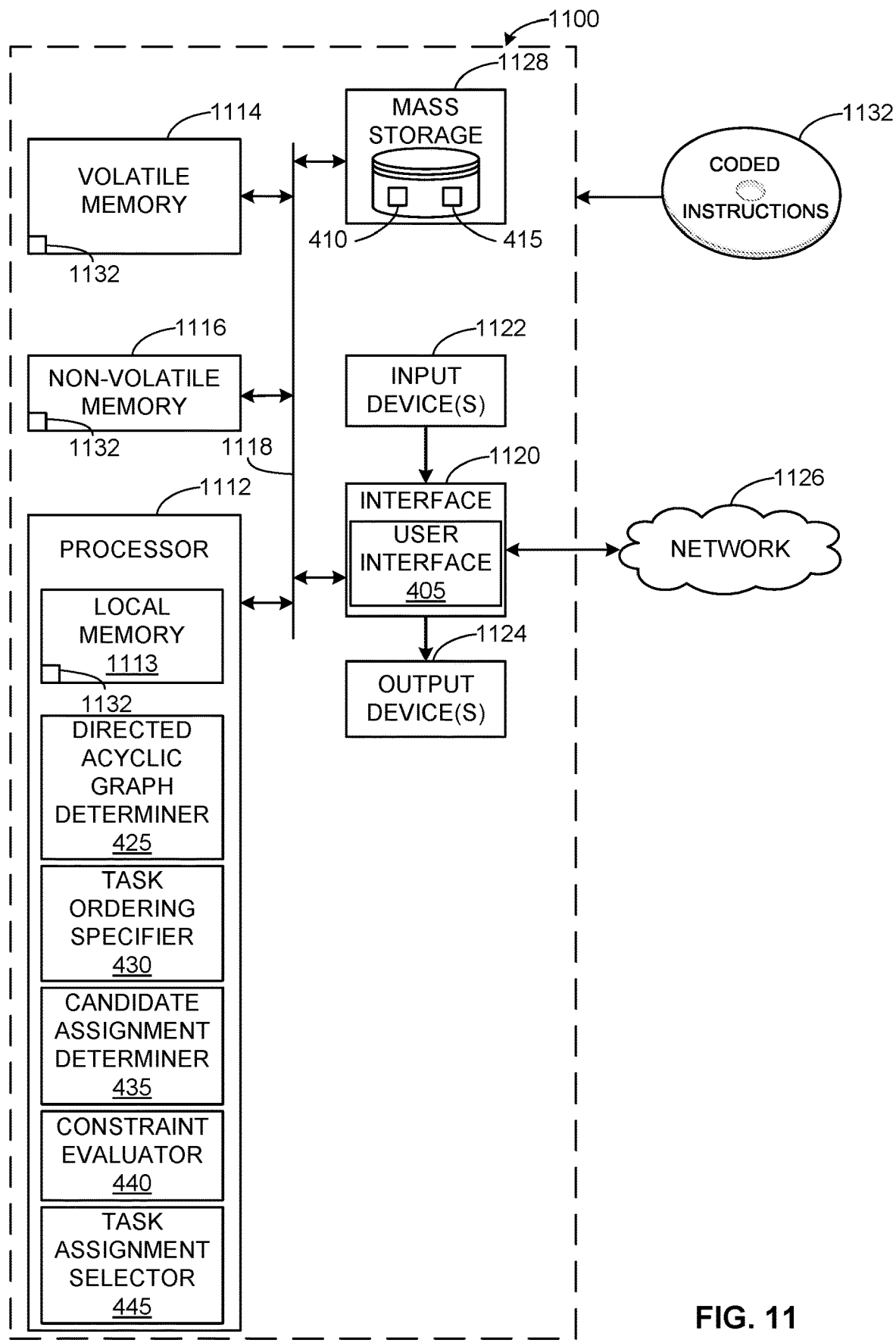
FIG. 11 is a block diagram of an example processor platform structured to execute the example machine readable instructions of FIG. 10 to implement the example video analytics task scheduler of FIG. 4.

At block 1040, the example task assignment selector 445 of the video analytics task scheduler 400 evaluates, as described above, the example upstream cost 505 for the combination of candidate task assignments determined at block 1025. At block 1045, the task assignment selector 445 compares, as described above, the upstream cost 505 determined for the current combination of candidate task assignments with the upstream cost 505, if any, for another combination of candidate task assignments determined in a prior processing iteration. If the current combination of candidate task assignments does not exhibit a reduced upstream cost 505 (block 1045), processing returns to block 1025 at which the candidate assignment determiner 435 determines a different combination of candidate task assignments for the group of video sources 115. However, if the current combination of candidate task assignments does exhibit a reduced upstream cost 505 (block 1045), at block 1050 the task assignment selector 445 retains the current combination of candidate task assignments and discards the prior combination, as described above. If there are other combinations of candidate task assignments to evaluate (block 1055), processing returns to block 1025 at which the candidate assignment determiner 435 determines a different combination of candidate task assignments for the group of video sources 115. Otherwise, at block 1060, the task assignment selector 445 outputs, as described above, the final retained combinations of candidate task assignments as the distributed assignment 110 for assigning the respective sequences of video analytics tasks identified in the application characteristics 415 to the devices 115, 125 and 120 in the cloud computing environment 100. Execution of the example program 1000 then ends FIG. 11 is a block diagram of an example processor platform 1100 capable of executing the instructions of FIG. 10 to implement the example video analytics task scheduler 400 of FIG. 4. The processor platform 1100 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 is configured via example instructions 1132, which include one or more the example instructions of FIG. 10, to implement the example directed acyclic graph determiner 425, the example task ordering specifier 430, the example candidate assignment determiner 435, the example constraint evaluator 440 and/or the example task assignment selector 445 of FIG. 4.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

In the illustrated example of FIG. 11, the interface circuit 1120 further utilized one or more of the input devices 1122 and/or the output devices 1124 to implement the example user interface 405 of FIG. 4.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID (redundant array of independent disks) systems, and digital versatile disk (DVD) drives. In the illustrated example of FIG. 11, one or more of the mass storage devices 1128 stores the example network topology 410 and the example application characteristics 415.

Coded instructions 1132 corresponding to the instructions of FIG. 10 may be stored in the mass storage device 1128, in the volatile memory 1114, in the non-volatile memory 1116, in the local memory 1113 and/or on a removable tangible computer readable storage medium, such as a CD or DVD 1136.

The foregoing disclosure provides examples of distributing assignment of video analytics tasks in an example cloud computing environment 100 to reduce bandwidth utilization. However, the disclosure is not limited thereto. For example, although example distributed video analytics task assignment procedures were described from the perspective of an example license plate recognition application, such procedures are not limited thereto. Rather, distributed video analytics task assignment procedures as disclosed herein can be used to distribute assignment of video analytics processing tasks in a cloud computing environment for any video analytics processing application exhibiting the model ordering, model parallelism and data parallelism properties described above. Moreover, the distributed task assignment procedures can be applied to distribute assignment of tasks in a cloud computing environment for any workload (and not just video analytics workloads) exhibiting the model ordering, model parallelism and data parallelism properties described above.

The following further examples, which include subject matter such as a task assignment method for video analytics processing in a cloud computing environment, means for assigning video analytics processing tasks in a cloud computing environment, at least one computer-readable medium including instructions that, when executed by a processor, cause the processor to assign video analytics processing tasks in a cloud computing environment, and an apparatus and/or a system for assigning video analytics processing tasks in a cloud computing environment are disclosed herein. The disclosed examples can be implemented individually and/or in one or more combinations.

Example 1 is an apparatus to perform task assignment for video analytics processing in a cloud computing environment. The apparatus of example 1 includes a directed acyclic graph determiner to determine a directed acyclic graph including nodes and edges to represent a plurality of video sources, a cloud computing platform, and a plurality of intermediate network devices in the cloud computing environment, the plurality of intermediate network devices to communicate data from the video sources to the cloud computing platform. The apparatus of example 1 also includes a task ordering specifier to specify task orderings for respective sequences of video analytics processing tasks to be executed in the cloud computing environment on respective video source data generated by respective ones of the video sources. The apparatus of example 1 further includes a task scheduler to assign, based on the directed acyclic graph and the task orderings, combinations of the video sources, the intermediate network devices and the cloud computing platform to execute the respective sequences of video analytics processing tasks to reduce an overall bandwidth utilized by the sequences of video analytics processing tasks in the cloud computing environment.

Example 2 includes the subject matter of example 1, wherein the nodes of the directed acyclic graph include a root node to represent the cloud computing platform, leaf nodes to represent the video source devices, and intermediate nodes to represent the intermediate network devices; and the edges of the directed acyclic graph include a first set of edges representing available communication paths between the video source devices and the intermediate network devices, and a second set of edges representing available communication paths between the intermediate network devices and the cloud computing platform in the cloud computing environment.

Example 3 includes the subject matter of example 2, wherein for each leaf node, the directed acyclic graph defines one respective uplink data path from that leaf node to the cloud computing platform.

Example 4 includes the subject matter of example 3, wherein a first leaf node of the directed acyclic graph corresponds to a first video source, a first combination of nodes defines a first uplink path from the first leaf node to the cloud computing platform, and the task scheduler is to assign at least some of the first combination of nodes included in the first uplink path to execute a first one of the sequences of video analytics processing tasks to preserve, along the first uplink path, a first task ordering for the first one of the sequences of video analytics processing tasks.

Example 5 includes the subject matter of example 4, wherein tasks ordered later in the first task ordering for the first one of the sequences of video analytics processing tasks are associated with lower bandwidth utilization than tasks ordered earlier in the first task ordering for the first one of the sequences of video analytics processing tasks, and the task scheduler is further to: (1) assign a first node in the first combination of nodes to execute a first task in the first one of the sequences of video analytics processing tasks, the first node at a first position of the first uplink path; (2) assign a second node in the first combination of nodes to execute a second task in the first one of the sequences of video analytics processing tasks, the second node at a second position of the first uplink path subsequent to the first position; and (3) assign the second node to execute each other task in the first one of the sequences of video analytics processing tasks ordered between the first task and the second task in the first task ordering.

Example 6 includes the subject matter of any one of example 1 to 5, wherein the task scheduler is further to assign the combinations of the video sources, the intermediate network devices and the cloud computing platform to execute the respective sequences of video analytics processing tasks based on a resource utilization constraint and a bandwidth utilization constraint, the resource utilization constraint to ensure available processing resources represented by the leaf nodes and the intermediate nodes of the directed acyclic graph are not exceeded, and the bandwidth utilization constraint to ensure available bandwidths represented by the first set of edges and the second set of edges of the directed acyclic graph are not exceeded.

Example 7 includes the subject matter of example 6, wherein the task scheduler further includes a candidate assignment determiner to iteratively determine different candidate assignments of respective combination of the video sources, the intermediate network devices and the cloud computing platform to execute the respective sequences of video analytics processing tasks associated with the video sources. The task scheduler of example 7 also includes a constraint evaluator to: (1) evaluate a first matrix-based equation for a first one of the candidate assignments to determine whether the first one of the candidate assignments satisfies the resource utilization constraint; and (2) evaluate a second matrix-based equation to determine whether the first one of the candidate assignments satisfies the bandwidth utilization constraint. The task scheduler of example 7 also includes a task assignment selector to retain the first one of the candidate assignments when the first one of the candidate assignments utilizes a lower overall bandwidth in the cloud computing environment than a prior retained second one of the candidate assignments.

Example 8 includes the subject matter of example 7, wherein the constraint evaluator is further to: (1) define dummy tasks to represent generation of the respective video source data by the respective ones of the video sources; (2) insert the dummy tasks at initial positions of the respective sequences of video analytics processing tasks associated with the respective ones of the video sources; and (3) use the respective sequences of video analytics processing tasks updated to include the dummy tasks to evaluate the first and second matrix-based equations.

Example 9 is a task assignment method for video analytics processing in a cloud computing environment. The method of example 9 includes determining, by executing an instruction with a processor, a graph including nodes and edges to represent a plurality of video sources, a cloud computing platform, and a plurality of intermediate network devices in the cloud computing environment, the plurality of intermediate network devices to communicate data from the video sources to the cloud computing platform. The method of example 9 also includes specifying, by executing an instruction with the processor, task orderings for respective sequences of video analytics processing tasks to be executed in the cloud computing environment on respective video source data generated by respective ones of the video sources. The method of example 9 further includes assigning, by executing an instruction with the processor and based on the graph and the task orderings, combinations of the video sources, the intermediate network devices and the cloud computing platform to execute the respective sequences of video analytics processing tasks to reduce an overall bandwidth utilized by the sequences of video analytics processing tasks in the cloud computing environment.

Example 10 includes the subject matter of example 9, wherein the nodes of the graph include a root node to represent the cloud computing platform, leaf nodes to represent the video source devices, and intermediate nodes to represent the intermediate network devices; and the edges of the graph include a first set of edges representing available communication paths between the video source devices and the intermediate network devices, and a second set of edges representing available communication paths between the intermediate network devices and the cloud computing platform in the cloud computing environment Example 11 includes the subject matter of example 10, wherein the graph is a directed acyclic graph and, for each leaf node, the directed acyclic graph defines one respective uplink data path from that leaf node to the cloud computing platform.

Example 12 includes the subject matter of example 11, wherein a first leaf node of the directed acyclic graph corresponds to a first video source, a first combination of nodes defines a first uplink path from the first leaf node to the cloud computing platform, and the assigning includes assigning at least some of the first combination of nodes included in the first uplink path to execute a first one of the sequences of video analytics processing tasks to preserve, along the first uplink path, a first task ordering for the first one of the sequences of video analytics processing tasks.

Example 13 includes the subject matter of example 12, wherein tasks ordered later in the first task ordering for the first one of the sequences of video analytics processing tasks are associated with lower bandwidth utilization than tasks ordered earlier in the first task ordering for the first one of the sequences of video analytics processing tasks, and the assigning further includes: (1) assigning a first node in the first combination of nodes to execute a first task in the first one of the sequences of video analytics processing tasks, the first node at a first position of the first uplink path; (2) assigning a second node in the first combination of nodes to execute a second task in the first one of the sequences of video analytics processing tasks, the second node at a second position of the first uplink path subsequent to the first position; and (3) assigning the second node to execute each other task in the first one of the sequences of video analytics processing tasks ordered between the first task and the second task in the first task ordering.

Example 14 includes the subject matter of any one of examples 9 to 13, wherein the assigning is further based on a resource utilization constraint and a bandwidth utilization constraint, the resource utilization constraint to ensure available processing resources represented by the leaf nodes and the intermediate nodes of the graph are not exceeded, and the bandwidth utilization constraint to ensure available bandwidths represented by the first set of edges and the second set of edges of the graph are not exceeded.

Example 15 includes the subject matter of example 14, wherein the assigning further includes: (1) iteratively determining different candidate assignments of respective combination of the video sources, the intermediate network devices and the cloud computing platform to execute the respective sequences of video analytics processing tasks associated with the video sources; and (2) for a first one of the candidate assignments: (a) evaluating a first matrix-based equation to determine whether the first one of the candidate assignments satisfies the resource utilization constraint; (b) evaluating a second matrix-based equation to determine whether the first one of the candidate assignments satisfies the bandwidth utilization constraint; and (c) retaining the first one of the candidate assignments when the first one of the candidate assignments utilizes a lower overall bandwidth in the cloud computing environment than a prior retained second one of the candidate assignments.

Example 16 includes the subject matter of example 15, wherein the assigning further includes: (1) defining dummy tasks to represent generation of the respective video source data by the respective ones of the video sources; (2) inserting the dummy tasks at initial positions of the respective sequences of video analytics processing tasks associated with the respective ones of the video sources; and (3) using the respective sequences of video analytics processing tasks updated to include the dummy tasks to evaluate the first and second matrix-based equations.

Example 17 is a tangible computer readable storage medium including computer readable instructions which, when executed, cause a processor to at least: (1) determine a directed acyclic graph including nodes and edges to represent a plurality of video sources, a cloud computing platform, and a plurality of intermediate network devices in a cloud computing environment, the plurality of intermediate network devices to communicate data from the video sources to the cloud computing platform; (2) specify task orderings for respective sequences of video analytics processing tasks to be executed in the cloud computing environment on respective video source data generated by respective ones of the video sources; and (3) assign, based on the directed acyclic graph and the task orderings, combinations of the video sources, the intermediate network devices and the cloud computing platform to execute the respective sequences of video analytics processing tasks.

Example 18 includes the subject matter of example 17, wherein the nodes of the directed acyclic graph include a root node to represent the cloud computing platform, leaf nodes to represent the video source devices, and intermediate nodes to represent the intermediate network devices; and the edges of the directed acyclic graph include a first set of edges representing available communication paths between the video source devices and the intermediate network devices, and a second set of edges representing available communication paths between the intermediate network devices and the cloud computing platform in the cloud computing environment.

Example 19 includes the subject matter of example 18, wherein for each leaf node, the directed acyclic graph defines one respective uplink data path from that leaf node to the cloud computing platform.

Example 20 includes the subject matter of example 19, wherein a first leaf node of the directed acyclic graph corresponds to a first video source, a first combination of nodes defines a first uplink path from the first leaf node to the cloud computing platform, and the instructions, when executed, further cause the processor to assign at least some of the first combination of nodes included in the first uplink path to execute a first one of the sequences of video analytics processing tasks to preserve, along the first uplink path, a first task ordering for the first one of the sequences of video analytics processing tasks.

Example 21 includes the subject matter of example 20, wherein tasks ordered later in the first task ordering for the first one of the sequences of video analytics processing tasks are associated with lower bandwidth utilization than tasks ordered earlier in the first task ordering for the first one of the sequences of video analytics processing tasks, and the instructions, when executed, further cause the processor to: (1) assign a first node in the first combination of nodes to execute a first task in the first one of the sequences of video analytics processing tasks, the first node at a first position of the first uplink path; (2) assign a second node in the first combination of nodes to execute a second task in the first one of the sequences of video analytics processing tasks, the second node at a second position of the first uplink path subsequent to the first position; and (3) assign the second node to execute each other task in the first one of the sequences of video analytics processing tasks ordered between the first task and the second task in the first task ordering.

Example 22 includes the subject matter of any one of examples 17 to 21, wherein the instructions, when executed, further cause the processor to assign the combinations of the video sources, the intermediate network devices and the cloud computing platform to execute the respective sequences of video analytics processing tasks based on a resource utilization constraint and a bandwidth utilization constraint, the resource utilization constraint to ensure available processing resources represented by the leaf nodes and the intermediate nodes of the directed acyclic graph are not exceeded, and the bandwidth utilization constraint to ensure available bandwidths represented by the first set of edges and the second set of edges of the directed acyclic graph are not exceeded.

Example 23 includes the subject matter of example 22, wherein the instructions, when executed, further cause the processor to: (1) iteratively determine different candidate assignments of respective combination of the video sources, the intermediate network devices and the cloud computing platform to execute the respective sequences of video analytics processing tasks associated with the video sources; and (2) for a first one of the candidate assignments: (a) evaluate a first matrix-based equation to determine whether the first one of the candidate assignments satisfies the resource utilization constraint; (b) evaluate a second matrix-based equation to determine whether the first one of the candidate assignments satisfies the bandwidth utilization constraint; and (c) retain the first one of the candidate assignments when the first one of the candidate assignments utilizes a lower overall bandwidth in the cloud computing environment than a prior retained second one of the candidate assignments.

Example 24 includes the subject matter of example 23, wherein the instructions, when executed, further cause the processor to: (1) define dummy tasks to represent generation of the respective video source data by the respective ones of the video sources; (2) insert the dummy tasks at initial positions of the respective sequences of video analytics processing tasks associated with the respective ones of the video sources; and (3) use the respective sequences of video analytics processing tasks updated to include the dummy tasks to evaluate the first and second matrix-based equations.

Example 25 is a tangible computer readable storage medium including computer readable instructions which, when executed, cause a processor to perform the method defined of any one of examples 9 to 16.

Example 26 is an apparatus including a processor to perform the method defined of any one of examples 9 to 16.

Example 27 is a system to perform task assignment for video analytics processing in a cloud computing environment. The system of example 27 includes means for determining a graph including nodes and edges to represent a plurality of video sources, a cloud computing platform, and a plurality of intermediate network devices in the cloud computing environment, the plurality of intermediate network devices to communicate data from the video sources to the cloud computing platform. The system of example 27 also includes means for specifying task orderings for respective sequences of video analytics processing tasks to be executed in the cloud computing environment on respective video source data generated by respective ones of the video sources. The system of example 27 further includes means for assigning, based on the graph and the task orderings, combinations of the video sources, the intermediate network devices and the cloud computing platform to execute the respective sequences of video analytics processing tasks to reduce an overall bandwidth utilized by the sequences of video analytics processing tasks in the cloud computing environment.

Example 28 includes the subject matter of example 27, wherein the nodes of the graph include a root node to represent the cloud computing platform, leaf nodes to represent the video source devices, and intermediate nodes to represent the intermediate network devices; and the edges of the graph include a first set of edges representing available communication paths between the video source devices and the intermediate network devices, and a second set of edges representing available communication paths between the intermediate network devices and the cloud computing platform in the cloud computing environment.

Example 29 includes the subject matter of example 28, wherein the graph is a directed acyclic graph and, for each leaf node, the directed acyclic graph defines one respective uplink data path from that leaf node to the cloud computing platform.

Example 30 includes the subject matter of example 29, wherein a first leaf node of the directed acyclic graph corresponds to a first video source, a first combination of nodes defines a first uplink path from the first leaf node to the cloud computing platform, and the means for assigning include means for assigning at least some of the first combination of nodes included in the first uplink path to execute a first one of the sequences of video analytics processing tasks to preserve, along the first uplink path, a first task ordering for the first one of the sequences of video analytics processing tasks.

Example 31 includes the subject matter of example 30, wherein tasks ordered later in the first task ordering for the first one of the sequences of video analytics processing tasks are associated with lower bandwidth utilization than tasks ordered earlier in the first task ordering for the first one of the sequences of video analytics processing tasks, and the means for assigning further include (1) means for assigning a first node in the first combination of nodes to execute a first task in the first one of the sequences of video analytics processing tasks, the first node at a first position of the first uplink path; (2) means for assigning a second node in the first combination of nodes to execute a second task in the first one of the sequences of video analytics processing tasks, the second node at a second position of the first uplink path subsequent to the first position; and (3) means for assigning the second node to execute each other task in the first one of the sequences of video analytics processing tasks ordered between the first task and the second task in the first task ordering.

Example 32 includes the subject matter of any one of examples 27 to 31, wherein the means for assigning is further based on a resource utilization constraint and a bandwidth utilization constraint, the resource utilization constraint to ensure available processing resources represented by the leaf nodes and the intermediate nodes of the graph are not exceeded, and the bandwidth utilization constraint to ensure available bandwidths represented by the first set of edges and the second set of edges of the graph are not exceeded.

Example 33 includes the subject matter of example 32, wherein the means for assigning further includes: (1) means for iteratively determining different candidate assignments of respective combination of the video sources, the intermediate network devices and the cloud computing platform to execute the respective sequences of video analytics processing tasks associated with the video sources; and (2) for a first one of the candidate assignments: (a) means for evaluating a first matrix-based equation to determine whether the first one of the candidate assignments satisfies the resource utilization constraint; (b) means for evaluating a second matrix-based equation to determine whether the first one of the candidate assignments satisfies the bandwidth utilization constraint; and (c) means for retaining the first one of the candidate assignments when the first one of the candidate assignments utilizes a lower overall bandwidth in the cloud computing environment than a prior retained second one of the candidate assignments.

Example 34 includes the subject matter of example 33, wherein the means for assigning further includes: (1) means for defining dummy tasks to represent generation of the respective video source data by the respective ones of the video sources; (2) means for inserting the dummy tasks at initial positions of the respective sequences of video analytics processing tasks associated with the respective ones of the video sources; and (3) means for using the respective sequences of video analytics processing tasks updated to include the dummy tasks to evaluate the first and second matrix-based equations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one non-transitory computer readable medium comprising computer readable instructions that, when executed, cause at least one processor to at least:
   access respective characteristics of a plurality of video analytics applications to be executed in a compute environment including a plurality of compute devices, ones of the video analytics applications associated with respective sequences of video analytics tasks, ones of the sequences of video analytics tasks to process respective input video frames to produce outputs associated with corresponding ones of the video analytics applications;
   determine an assignment of the respective sequences of video analytics tasks across the plurality of compute devices in the compute environment based on (i) the respective characteristics of the plurality of video analytics applications, (ii) respective capacities of the plurality of compute devices, and (iii) a directed acyclic graph that is to represent the plurality of compute devices and communication paths in the compute environment; and
   iteratively update the assignment of the respective sequences of video analytics tasks across the plurality of compute devices in the compute environment to reduce a combined resource utilization cost associated with execution of the respective sequences of video analytics tasks in the compute environment.

2. The at least one non-transitory computer readable medium of claim 1, wherein the directed acyclic graph is to represent a topology of the compute environment.

3. The at least one non-transitory computer readable medium of claim 1, wherein the directed acyclic graph includes nodes and edges, respective ones of the nodes to represent corresponding ones of the compute devices in the compute environment, respective ones of the edges to represent corresponding ones of the communication paths between the compute devices in the compute environment.

4. The at least one non-transitory computer readable medium of claim 3, wherein the compute devices include one or more video source devices, one or more cloud platforms, and one or more network devices, and the communication paths represented by the directed acyclic graph are upstream communication paths to connect the one or more video source devices to the one or more cloud platforms via the one or more network devices.

5. The at least one non-transitory computer readable medium of claim 4, wherein the nodes of the directed acyclic graph include one or more leaf nodes to represent the one or more video source devices, one or more root nodes to represent the one or more cloud platforms, and one or more intermediate nodes to represent the one or more network devices, and the edges of the directed acyclic graph include a first set of edges to represent a corresponding first set of the upstream communication paths between the one or more video source devices and the one or more network devices, and a second set of edges to represent a corresponding second set of the upstream communication paths between the one or more network devices and the one or more cloud platforms.

6. The at least one non-transitory computer readable medium of claim 1, wherein the combined resource utilization cost corresponds to an overall bandwidth utilized by the execution of the respective sequences of video analytics tasks in the compute environment.

7. The at least one non-transitory computer readable medium of claim 1, wherein the respective characteristics of the plurality of video analytics applications include at least one of task ordering, processor requirements or memory requirements associated with the respective sequences of video analytics tasks, and the respective capacities of the plurality of compute devices include at least one of processor capacities or network capacities of the plurality of compute devices.

8. An apparatus comprising:
at least one memory;
computer readable instructions; and
processor circuitry to execute the computer readable instructions to at least:
  access respective characteristics of a plurality of video analytics applications to be executed in a compute environment including a plurality of compute devices, ones of the video analytics applications associated with respective sequences of video analytics tasks, ones of the sequences of video analytics tasks to process respective input video frames to produce outputs associated with corresponding ones of the video analytics applications;
  determine an assignment of the respective sequences of video analytics tasks across the plurality of compute devices in the compute environment based on (i) the respective characteristics of the plurality of video analytics applications, (ii) respective capacities of the plurality of compute devices, and (iii) a directed acyclic graph that is to represent the plurality of compute devices and communication paths in the compute environment; and
  iteratively update the assignment of the respective sequences of video analytics tasks across the plurality of compute devices in the compute environment to reduce a combined compute cost associated with execution of the respective sequences of video analytics tasks in the compute environment.

9. The apparatus of claim 8, wherein the directed acyclic graph is to represent a topology of the compute environment.

10. The apparatus of claim 8, wherein the directed acyclic graph includes nodes and edges, respective ones of the nodes to represent corresponding ones of the compute devices in the compute environment, respective ones of the edges to represent corresponding ones of the communication paths between the compute devices in the compute environment.

11. The apparatus of claim 10, wherein the compute devices include one or more video source devices, one or more cloud platforms, and one or more network devices, and the communication paths represented by the directed acyclic graph are upstream communication paths to connect the one or more video source devices to the one or more cloud platforms via the one or more network devices.

12. The apparatus of claim 11, wherein the nodes of the directed acyclic graph include one or more leaf nodes to represent the one or more video source devices, one or more root nodes to represent the one or more cloud platforms, and one or more intermediate nodes to represent the one or more network devices, and the edges of the directed acyclic graph include a first set of edges to represent a corresponding first set of the upstream communication paths between the one or more video source devices and the one or more network devices, and a second set of edges to represent a corresponding second set of the upstream communication paths between the one or more network devices and the one or more cloud platforms.

13. The apparatus of claim 8, wherein the combined compute cost corresponds to an overall bandwidth utilized by the execution of the respective sequences of video analytics tasks in the compute environment.

14. The apparatus of claim 8, wherein the respective characteristics of the plurality of video analytics applications include at least one of task ordering, processor requirements or memory requirements associated with the respective sequences of video analytics tasks, and the respective capacities of the plurality of compute devices include at least one of processor capacities or network capacities of the plurality of compute devices.

15. A method comprising:
  accessing respective characteristics of a plurality of video analytics applications to be executed in a compute environment including a plurality of compute devices, ones of the video analytics applications associated with respective sequences of video analytics tasks, ones of the sequences of video analytics tasks to process respective input video frames to produce outputs associated with corresponding ones of the video analytics applications;
  determining, by executing an instruction with at least one processor, an assignment of the respective sequences of video analytics tasks across the plurality of compute devices in the compute environment based on (i) the respective characteristics of the plurality of video analytics applications, (ii) respective capacities of the plurality of compute devices, and (iii) a directed acyclic graph that is to represent the plurality of compute devices and communication paths in the compute environment; and
  iteratively updating the assignment of the respective sequences of video analytics tasks across the plurality of compute devices in the compute environment to reduce a combined resource utilization cost associated with execution of the respective sequences of video analytics tasks in the compute environment.

16. The method of claim 15, wherein the directed acyclic graph is to represent a topology of the compute environment.

17. The method of claim 15, wherein the directed acyclic graph includes nodes and edges, respective ones of the nodes to represent corresponding ones of the compute devices in the compute environment, respective ones of the edges to represent corresponding ones of the communication paths between the compute devices in the compute environment.

18. The method of claim 17, wherein the compute devices include one or more video source devices, one or more cloud platforms, and one or more network devices, and the communication paths represented by the directed acyclic graph are upstream communication paths to connect the one or more video source devices to the one or more cloud platforms via the one or more network devices.

19. The method of claim 18, wherein the nodes of the directed acyclic graph include one or more leaf nodes to represent the one or more video source devices, one or more root nodes to represent the one or more cloud platforms, and one or more intermediate nodes to represent the one or more network devices, and the edges of the directed acyclic graph include a first set of edges to represent a corresponding first set of the upstream communication paths between the one or more video source devices and the one or more network devices, and a second set of edges to represent a corresponding second set of the upstream communication paths between the one or more network devices and the one or more cloud platforms.

20. The method of claim 15, wherein the combined resource utilization cost corresponds to an overall bandwidth utilized by the execution of the respective sequences of video analytics tasks in the compute environment, the respective characteristics of the plurality of video analytics applications include at least one of task ordering, processor requirements or memory requirements associated with the respective sequences of video analytics tasks, and the respective capacities of the plurality of compute devices include at least one of processor capacities or network capacities of the plurality of compute devices.

\* \* \* \* \*